(12) United States Patent
Itakura et al.

(10) Patent No.: US 9,165,230 B2
(45) Date of Patent: Oct. 20, 2015

(54) INFORMATION CODE AND INFORMATION CODE READING APPARATUS

(71) Applicant: DENSO WAVE INCORPORATED, Chita-gun, Aichi-pref. (JP)

(72) Inventors: Kazumi Itakura, Kariya (JP); Toshio Morimoto, Ichinomiya (JP)

(73) Assignee: DENSO WAVE INCORPORATED, Chita-gun (JP)

( * ) Notice: Subject to any disclaimer, the term of this patent is extended or adjusted under 35 U.S.C. 154(b) by 81 days.

(21) Appl. No.: 13/850,529

(22) Filed: Mar. 26, 2013

(65) Prior Publication Data

US 2013/0341402 A1 Dec. 26, 2013

(30) Foreign Application Priority Data

Jun. 20, 2012 (JP) ................................. 2012-139005
Jun. 20, 2012 (JP) ................................. 2012-139006

(51) Int. Cl.
*G06K 19/06* (2006.01)
*G06K 7/10* (2006.01)
*G06K 7/12* (2006.01)

(52) U.S. Cl.
CPC ........ *G06K 19/0614* (2013.01); *G06K 7/10821* (2013.01); *G06K 7/12* (2013.01)

(58) Field of Classification Search
CPC .. G06K 19/0614; G06K 7/10821; G06K 7/12
USPC ................................. 235/462.41, 454, 462.01
See application file for complete search history.

(56) References Cited

U.S. PATENT DOCUMENTS

2001/0023457 A1   9/2001   Tack-don et al.

FOREIGN PATENT DOCUMENTS

| EP | 2 458 527 A2 | 5/2012 |
| FR | 2 682 790 A1 | 4/1993 |
| JP | A-2001-273441 | 10/2001 |

OTHER PUBLICATIONS

Extended European Search Report issued in European Application No. 13161151.9 issued Jun. 10, 2014.

*Primary Examiner* — Kristy A Haupt
(74) *Attorney, Agent, or Firm* — Oliff PLC

(57) ABSTRACT

An information code includes a code region composed of a plurality of light-color modules and a plurality of dark-color modules. The code region includes a specified area which is preset and disables decoding of the information code by shielding light. The specified area is covered by a covering which exhibits a dark-color reflectance property when light of a first wavelength band is radiated thereto and which is transmissive to light of a second wavelength band. The first and second wavelength bands differ from each other. The light of the first wavelength band is visible light for example. Comparison between information code images imaged respectively on the light of the first and second wavelength bands makes it possible to determine whether the information code or an object with the information code is authentic.

20 Claims, 17 Drawing Sheets

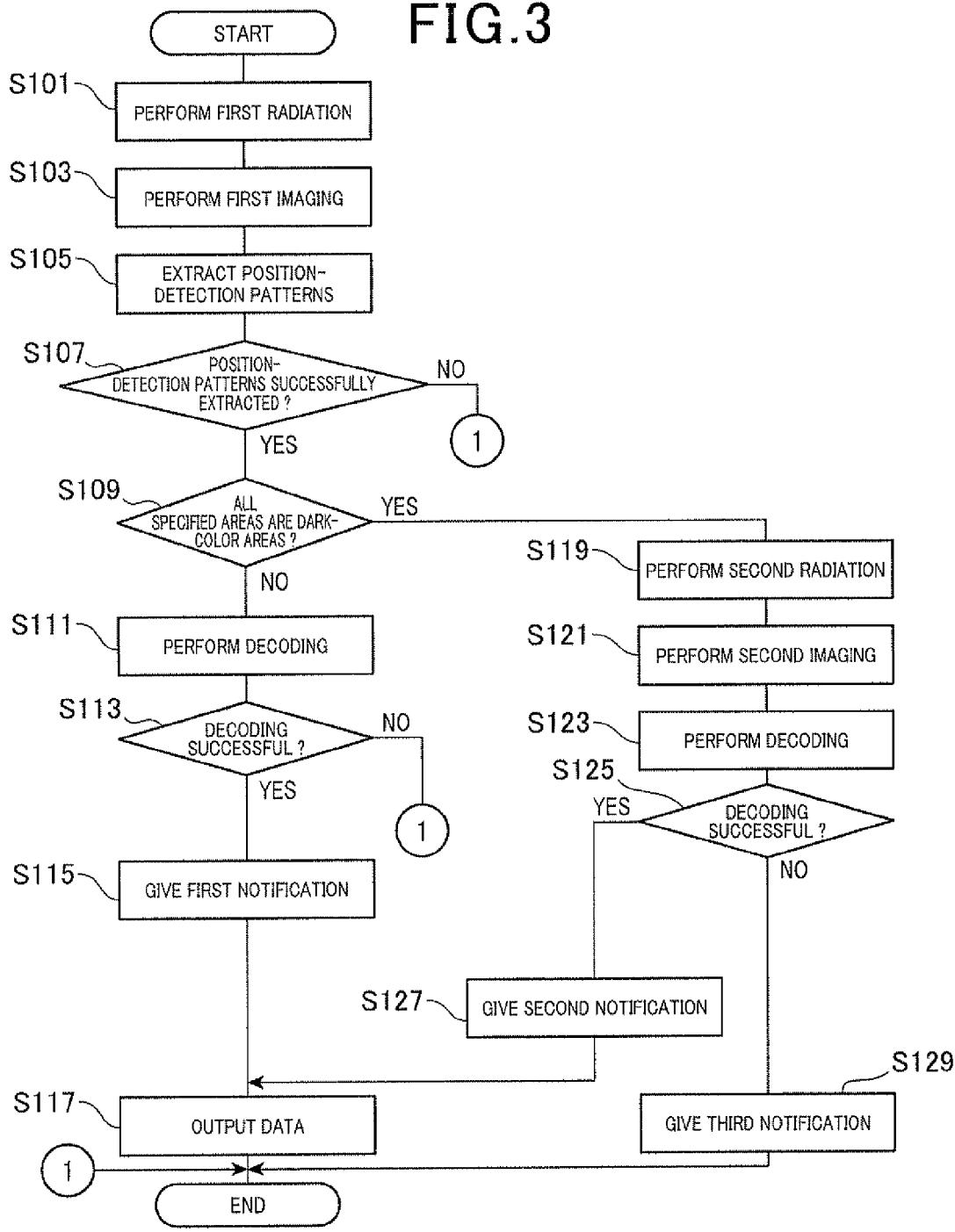

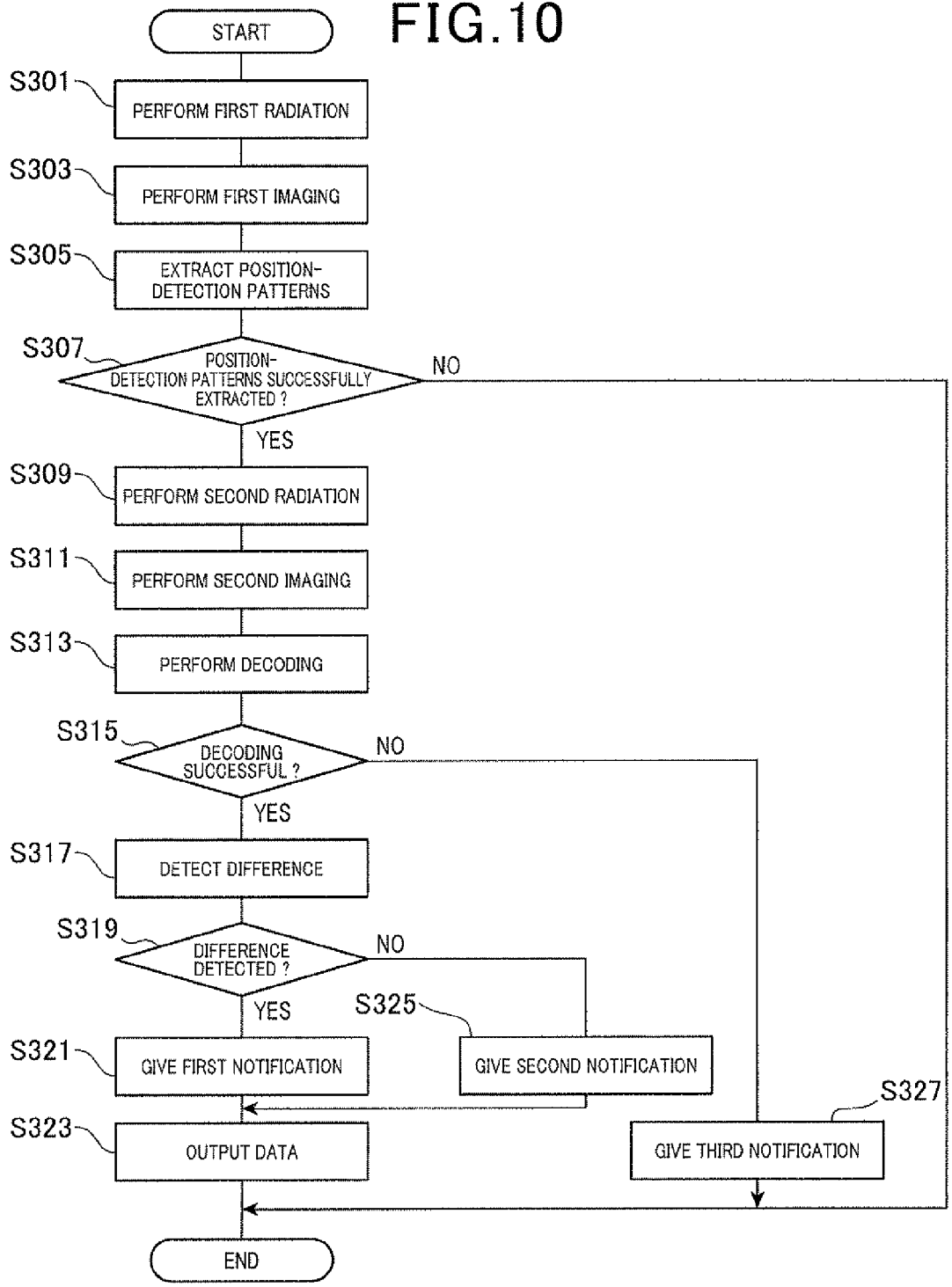

INFORMATION CODE AND INFORMATION CODE READING APPARATUS

CROSS-REFERENCE TO RELATED APPLICATION

This application is based on and claims the benefit of priorities from earlier Japanese Patent Application Nos. 2012-139005 and 2012-139006 both filed Jun. 20, 2012, the descriptions of which are incorporated herein by reference.

BACKGROUND OF THE INVENTION

1. Technical Field of the Invention

The present invention relates to an information code and an information code reading apparatus that reads the information code.

2. Related Art

Recently, information codes, such as bar codes or QR Codes™, are used for various purposes. The ways of using such information codes are also various. For example, an information code can be optically read by executing a given application in a camera cell-phone or a smartphone to easily acquire the information specific to the information code. Thus, using an information code, users can easily enjoy such services as follow-up research of food, guide to a website, issuance of a coupon or a ticket, and the like.

As a technique for providing services by using an information code as mentioned above, an advertisement apparatus is well known as disclosed in JP-A-2001-273441. This advertisement apparatus produces a code image which is encoded with Internet address information of an advertiser or index information for specifying the internet address information. Then, the code image is printed, for example, on various products, gifts, leaflets, or the like, as printed media and provided to consumers. The consumers, on the other hand, can each acquire the code image provided as mentioned above using an optical device to extract and decode the code information encoded in the code image. In this way, each consumer can acquire the address information or the index information included in the code information. After acquiring the address information, the consumer can act on the basis of the address information. Thus, the consumer can enjoy the services provided by the advertiser. When the information acquired by the consumer is the index information, the consumer can connect to a predetermined server computer on the internet to acquire the address information corresponding to index information and then can act on the basis of the address information or the like. In this way, consumers can enjoy the services provided by the advertiser.

However, an information code simply indicated such as on a printed media can be easily copied by anyone by using a copying machine or the like. For this reason, the following problem could be caused. For example, a fraudulent code, i.e. an information code copied from an authentic information code with fraudulent intention, can be easily produced by anyone. Therefore, at a gate, for example, where entrance and exit are managed by reading an information code, such a fraudulent code cannot be detected unless the authenticity of the information code is determined.

SUMMARY

Hence it is desired to provide an information code that can be easily determined as to its authenticity and to provide an information code reading apparatus.

As an exemplary embodiment, an information code includes a code region in which, a plurality of light-color modules exhibiting reflectance properties of light color and a plurality of dark-color modules exhibiting reflectance properties of dark color are arrayed, the reflectance properties being exhibited when either light of a first wavelength band or light of a second wavelength band, which has a wavelength different from the first wavelength band, is radiated to the information code. The code region includes a predetermined specified area. Decoding of the information code is disabled when light is shielded in the specified area. The specified area is covered with a covering. The covering transmits the light of the second wavelength band but exhibits reflectance properties of dark color when the light of the first wavelength band is radiated thereto.

An information code reading apparatus that optically reads an information code, according to an exemplary embodiment, includes an illuminating means, an imaging means, a decoding means, a first determining means and a second determining means. The illuminating means is able to radiate both light of the first wavelength band and light of the second wavelength band. The imaging means picks up an image of the information code. The decoding means decodes the code region on the basis of the array of the modules configuring the code region imaged by the imaging means. The first determining means determines whether or not the specified area appears to be a dark-color area in a first code image of the information code imaged by the imaging means when using light of the first wavelength band (which is radiated to the information code by the illuminating means). The second determining means determines that an information code having the covering has been decoded when the code region is decoded by the decoding means on the basis of a second code image of the information code that has been imaged by the imaging means in a state where the light of the second wavelength band is radiated to the information code by the illuminating means, after the specified area has been determined as being a dark-color area by the first determining means.

An information code according to another exemplary embodiment includes an information code having a code region in which a plurality of light-color modules exhibiting reflectance properties of light color and a plurality of dark-color modules exhibiting reflectance properties of dark color are arrayed, the reflectance properties being exhibited when either the light of the first wavelength band or the light of the second wavelength band, which has a wavelength different from the first wavelength band, is radiated to the information code. At least a part of the plurality of light-color modules is covered with a covering that transmits the light of the second wavelength band but exhibits reflectance properties of dark color when the light of the first wavelength band is radiated thereto.

An information code reading apparatus that optically reads an information code, according to another exemplary embodiment includes an illuminating means, an imaging means, a decoding means, a difference detecting means and a determining means. The illuminating means is able to radiate both of the light of the first wavelength band and the light of the second wavelength band. The imaging means picks up an image of the information code. The decoding means decodes the code region on the basis of the array of the modules configuring the code region that has been imaged by the imaging means. The difference detecting means detects a difference between an image of the information code picked up by the imaging means in a state where the light of the first wavelength band is radiated, and an image of the information code picked up by the imaging means in a state where the light of the second wavelength band is radiated. The determining means determines the presence/absence of the covering on the basis of the difference detected by the difference detecting means.

The bracketed references in the above description indicate correspondency with the specific means in the embodiments that will be described later.

The information code according to an exemplary embodiment includes a predetermined specified area. Decoding of the information code is disabled in the specified area when light is shielded in the specified area. The specified area is covered with a covering. The covering transmits the light of the second wavelength band but exhibits reflectance properties of dark color when the light of the first wavelength band is radiated thereto.

In a code image of the information code configured as described above, the code image being picked up in a state where the light of the first wavelength band is radiated to the information code (hereinafter is referred to as a first code image), the predetermined specified region is in a dark color. However, the information code can be decoded on the basis of a code image picked up in a state where the light of the second wavelength band is radiated to the information code (hereinafter referred to as a second code image). Thus, using authenticity determination suitable for an information code having the covering as described above, authenticity of an information code can be made. In other words, when the specified area in the first code image of an information code is in a dark color and the information code can be decoded on the basis of the second code image of the information code, the information code can be determined as being an authentic information code having the covering as described above.

On the other hand, an information code can be determined as not being an authentic information code when the information code corresponds to one that cannot be decoded in the second code image, such as a fraudulent code obtained by fraudulently falsifying an authentic information code having the covering, or an information code in which the specified area is simply dirty, or a generally used information code that can be decoded on the basis of the first code image.

In this way, authenticity determination is facilitated for the information code having the covering.

In an information code reading apparatus, a first determining means determines, first, whether the specified area in the first code image is a dark-color area. If the area is determined to be a dark-color area, the code region is then decoded by a decoding means on the basis of the second code image. Upon decoding of the code region, a second determining means determines that an information code having the covering has been decoded.

Accordingly, if an information code is the one according to this embodiment, the specified region in the first code image picked up by the imaging means should be in a dark color, and the information code should be decoded on the basis of the second code image picked up by the imaging means. Thus, the imaged information code can be determined to be an authentic information code having the covering. On the other hand, if an image of a fraudulently copied information code is picked up from the first code image, decoding is disabled in the second code image as well. Thus, the imaged information code can be determined not to be authentic, which may be an inauthentic information code.

In this way, an information code reading apparatus is realized, which is able to facilitate authenticity determination using an information code having the covering.

On the other hand, in an information code according to another embodiment, a specified area is set, which at least partially includes a plurality of light-color modules arrayed in a code region. The specified area is covered with a covering that transmits the light of the second wavelength band but exhibits reflectance properties of dark color when the light of the first wavelength band is radiated thereto.

Thus, a difference is caused when superposing a code image picked up in a state where the light of the first wavelength band is radiated to the information code (hereinafter referred to as a first code image), with a code image picked up in a state where the light of the second wavelength band is radiated to the information code (hereinafter referred to as a second code image). In this regard, using an information code having the covering as described as an information code for determining authenticity, an information code from which a difference as described above is detected can be determined to be an authentic information code having the covering as described above. On the other hand, an information code from which no difference as described above is detected can be determined to be different from an authentic one, which may be an inauthentic information code.

Thus, authenticity determination can be facilitated for an information code having the covering as described above.

In an information code reading apparatus according to another embodiment, a difference detecting means detects a difference between a first code image that is an image of an information code picked up by an imaging means in a state where the light of the first wavelength band is radiated to the information code, and a second code image that is an image of the information code picked up by the imaging means in a state where the light of the second wavelength band is radiated to the information code. Then, based on the difference detected by the difference detecting means, the presence/absence of the covering is determined by a determining means.

Thus, when an information code is imaged by the imaging means, the presence of the covering is determined on the basis of the difference detected by the difference detecting means. Accordingly, the imaged information code can be determined to be an authentic information code having the covering. On the other hand, if an image of a fraudulently copied information code is picked up, the difference as described above will not be detected and thus the information code is determined as not having the covering. Accordingly, the imaged information code can be determined to be, for example, an inauthentic information code.

In this way, an information code reading apparatus is realized, which is able to facilitate authenticity determination using an information code having the covering.

BRIEF DESCRIPTION OF THE DRAWINGS

In the accompanying drawings:

FIG. 3 is flow diagram illustrating an authenticity determination process performed by a control unit, according to the first embodiment;

FIG. 10 is a flow diagram illustrating an example of an authenticity determination process performed by a control unit, according to the fourth embodiment;

DETAILED DESCRIPTION OF THE PREFERRED EMBODIMENTS

With reference to the accompanying drawings, hereinafter are described some embodiments and modifications of an information code and an information code reading apparatus according to the present invention.

First Embodiment

Figure 1:
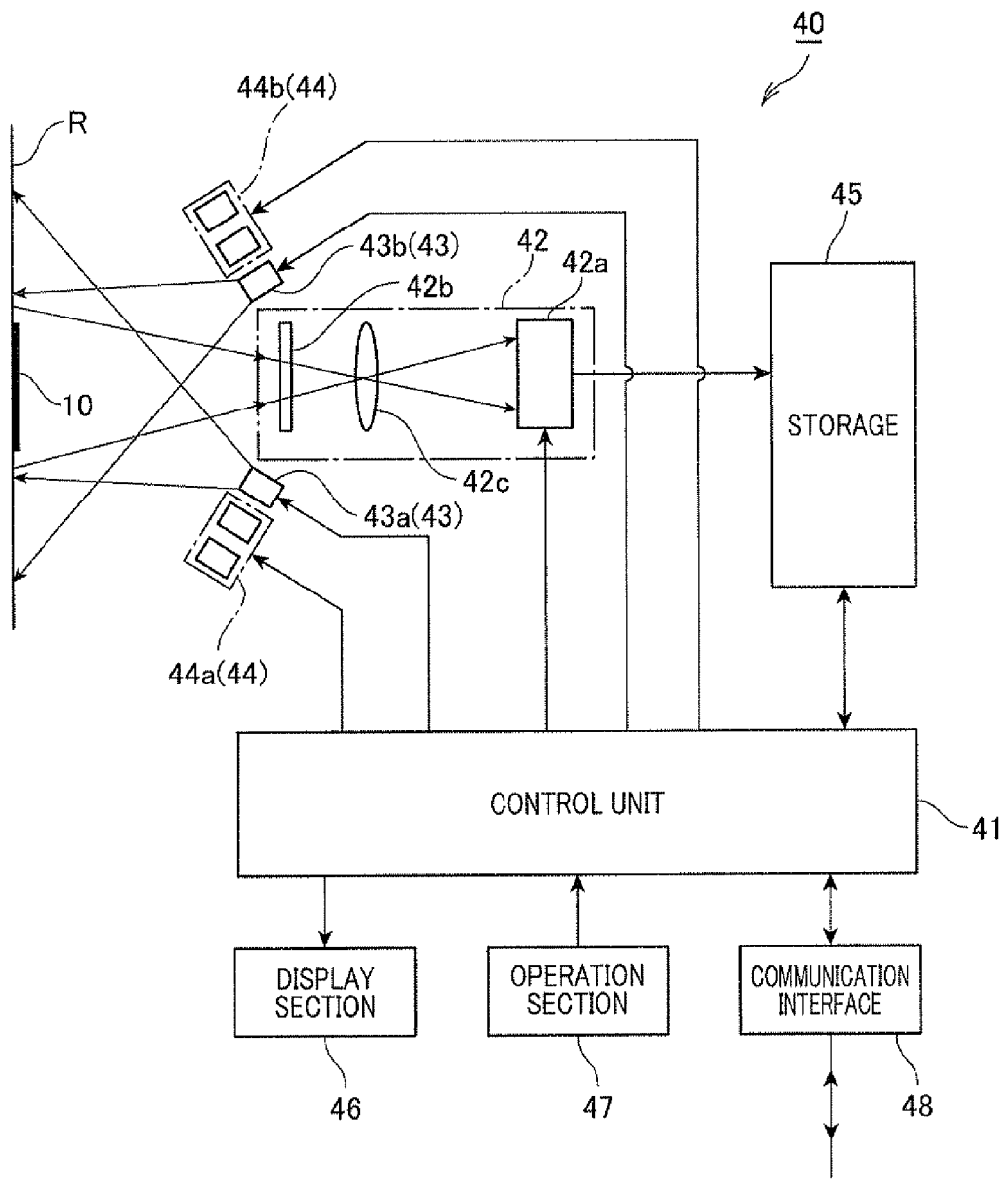
FIG. 1 is a schematic block diagram illustrating a principal part of an information code reading apparatus that reads an information code, according to a first embodiment and the subsequent embodiments of the present invention.

Referring to FIGS. 1 to 4, first, a first embodiment is described. FIG. 1 is a schematic block diagram illustrating a principal part of an information code reading apparatus 40 that reads an information code 10, according to the first embodiment.

The information code reading apparatus 40 shown in FIG. 1 is configured to optically read generally used information codes or information codes 10 composed of modules and having a configuration characteristic of the present invention. Generally used information codes include one-dimensional codes (e.g., bar codes) and two-dimensional codes (e.g., QR Codes™, data matrix codes, MaxiCodes, Aztec Codes, etc.) put on an object R described by the information to be indicated by the information code 10 (hereinafter just referred to as an object R). Hereinafter, the information code 10 and the information code reading apparatus 40 are described in detail.

(Information Code Reading Apparatus)

The information code reading apparatus 40 shown in FIG. 1 has a function of picking up and reading an image of an information code put on the object R. The information code reading apparatus 40 includes a control unit 41, an imager 42, a first illumination source 43, a second illumination source 44 and a storage 45. The control unit 41 includes a CPU. The imager 42, which configures a light-receiving optical system, is configured as a camera that includes a light-receiving sensor (e.g., C-MOS (complementary metal oxide semiconductor) area sensor, CCD (charge coupled device) area sensor, etc.). The illumination source 43 includes a pair of first illumination sources 43a and 43b and can radiate light of a first wavelength band. The second illumination sources 44 includes a pair of second illumination sources 44a and 44b and can radiate light of a second wavelength band. The first and second illumination sources 43 and 44 configure an illumination optical system. The storage 45 is configured by storing means including a ROM, a RAM and a nonvolatile memory. The information code reading apparatus 40 also includes a display section 46 configured such as by a liquid crystal display, and an operation panel 47 configured such as by various operating keys.

The imager 42, which is arranged between the pair of first illumination sources 43a and 43b, includes a light-receiving sensor 42a and an imaging lens 42c. The light-receiving sensor 42a of the imager 42 has a light-receiving surface that receives the light reflected from the object R or from the information code put on the object R to form an image on the surface. Thus, the imager 42 has a function of producing image data of the information code. The light-receiving sensor 42 is configured to receive the light radiated to and reflected from the object R. For example, the light-receiving sensor 42 corresponds to a line sensor in which light-receiving elements i.e. solid-state image sensing devices, such as C-MOSs and CCDs, are one-dimensionally arrayed, or an area sensor in which these light-receiving elements are two-dimensionally arrayed. The imaging lens 42c is configured such as by a lens-barrel and a plurality of condensing lenses accommodated in the lens-barrel. The imaging lens 42c has a function of forming an image of the information code on the light-receiving surface of the light-receiving sensor 42a. An image signal outputted from the light-receiving sensor 42a in the light-receiving optical system is ensured to be stored in an image data storage area, for example, of the storage 45. The imager 42 corresponds to an example of the "imaging means".

The first and second illumination sources 43 and 44 configuring the illumination source (illumination optical system) are arranged on both sides of the imager 42 (light-receiving optical system), or arranged sandwiching the imager 42. The pair of first illumination sources 43a and 43b are configured by LEDs that radiate visible light having a wavelength ranging, for example, from 380 nm to 750 nm (hereinafter also referred to as the light of a first wavelength band). The pair of second illumination sources 44a and 44b are configured by LEDs that radiate infrared light having a wavelength of, for example, 750 nm or more (hereinafter also referred to as the light having a second wavelength band), In the present embodiment, the number of light sources of the second illumination source 44 is ensured to be larger than the number of light sources of the first illumination source 43. The first or second illumination source 43 or 44 of the present embodiment corresponds to an example of the "illuminating means".

The storage 45 is configured by semiconductor memory units which correspond, for example, to a RAM (DRAM (dynamic random access memory), SRAM (static random access memory), etc.) and ROM (EPROM (erasable programmable read-only memory), EEPROM (electrically erasable programmable read-only memory), etc.). In the storage 45, the RAM is configured to include the image data storage area mentioned above, a work area and a reading condition table. The work area is used by the control unit 41 when performing various processes, such as arithmetic operations and logic operations. Further, for example, the ROM is configured to store in advance a given program that can execute various processes, or to store a system program that can control various hardware components, such as the illumination sources, the light-receiving sensor 42a and the like.

The control unit 41 is configured such as by a microcomputer that can control the entire information code reading apparatus 40. The control unit 41 includes a CPU, a system bus and an input/output interface and has a function of processing information. In the present embodiment, the control unit 41 carries out a reading process. Specifically, the control unit 41 has a function of extracting a code region occupying in the information code on the basis of a code image of the information code picked up by the imager 42, and decoding the information code on the basis of the extraction. The control unit 41 also carries out an authenticity determination process which will be described later. Specifically, the control unit 41 has a function of determining the authenticity of the information code on the basis of the code image of the information code picked up by the imager 42.

(Information Code)

Figure 2A:
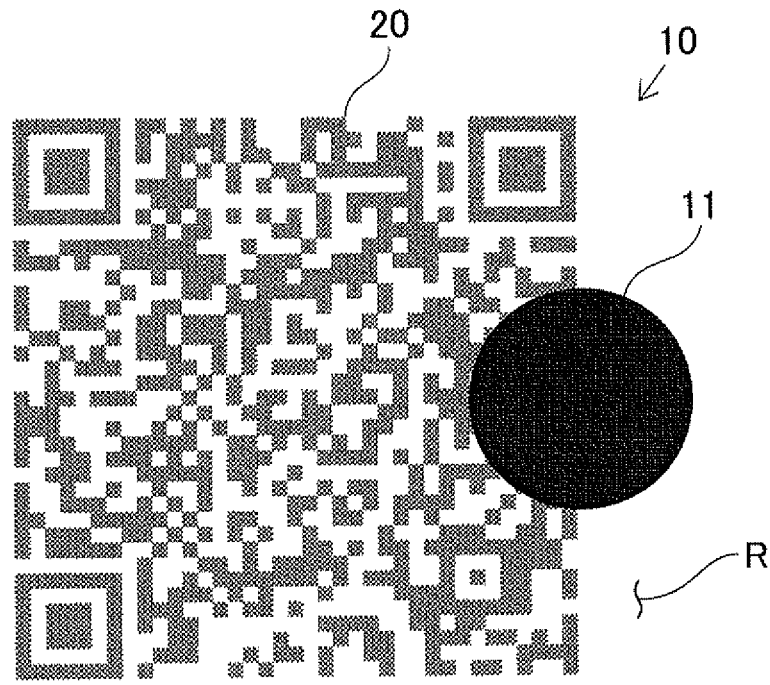
FIG. 2A is an explanatory diagram illustrating an example of an information code, according to the first embodiment.
Figure 2B:
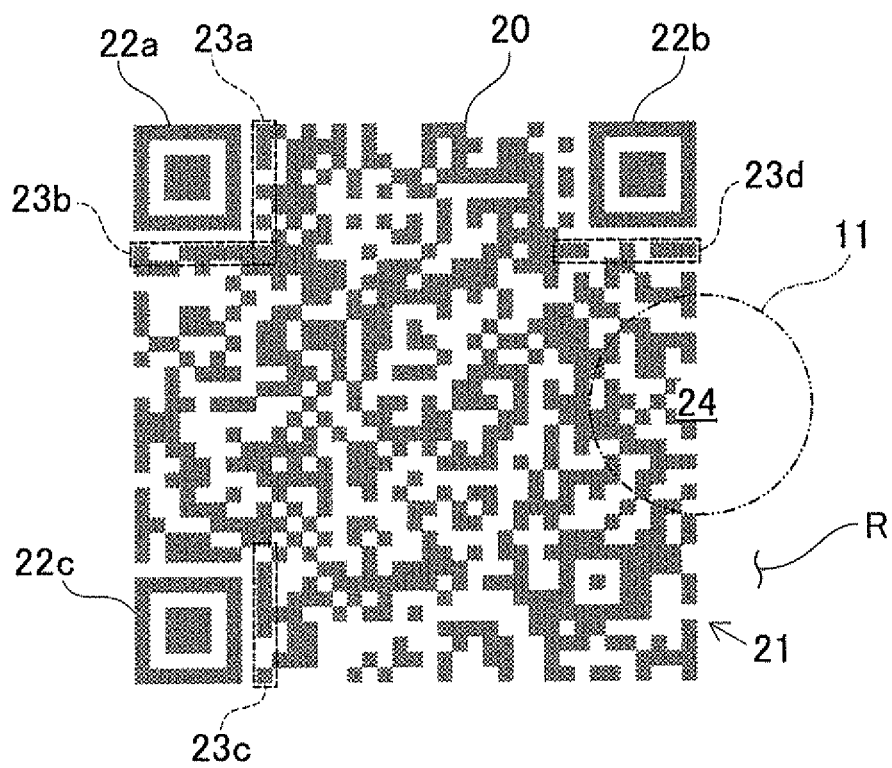
FIG. 2B is an explanatory diagram illustrating a state where a covering has been removed from the information code illustrated in FIG. 2A.

FIG. 2A is an explanatory diagram illustrating an example of the information code 10 having a covering 11, according to the first embodiment. FIG. 2B is an explanatory diagram illustrating a state where the covering 11 has been removed from the information code 10 illustrated in FIG. 2A. In FIGS. 2A and 2B, for the sake of descriptive convenience, dark-color modules, which are in the same dark color as that of the covering 11, are shown in a color lighter than the covering 11, i.e. shown in a gray color.

As shown in FIG. 2A, the information code 10 includes a code region 20 and the covering 11. In the code region 20, a plurality of light-color modules and dark-color modules are arrayed. The covering 11 covers a part of the code region 20 and extends beyond an edge of the code region 20 to spread over part of the surface of the object R. Each of the light-color modules and the dark-color modules is a minimum unit cell. In the figures, the light-color modules are shown in white, while the dark-color modules are shown in gray. This illustrative manner is applied to other drawings.

As shown in FIG. 2B, in the code region 20, the plurality of light- and dark-color modules are arranged in a square region, forming a matrix array, similar to a QR Code™. Thus, the code region 20 as a whole is configured as a rectangular region.

Specifically, similar to a QR Code™, the code region 20 includes a data region, three position-detection patterns 22a, 22b and 22c, and format codes 23a, 23b, 23c and 23d. The data region 21 is configured to include requested necessary information. The position-detection patterns 22a, 22b and 22c are used for specifying positions in the code region 20 in image data. The position-detection patterns 22a, 22b and 22c are arranged at three of four corners of the code region 20. The format codes 23a, 23b, 23c and 23d are arranged in the vicinities of the position-detection patterns 22a, 22b and 22c. The format codes 23a, 23b, 23c and 23d are configured to specify format information used for decoding the information code 10. The format information includes the information on the region where the data region 21 is present, the type of the code in use, the size of the modules, a mask pattern and an error correction rate. Therefore, decoding of the code region 20 is disabled when most of the data region 21 is occluded or the position-detection patterns 22a, 22b and 22c or the format codes 23a, 23b, 23c and 23d are occluded.

The light-color modules among the modules configuring the code region 20 are configured to exhibit light-color reflectance properties (i.e. to reflect light in a light color), when radiated with the light of the first wavelength band of a visible light range or the light of the second wavelength band different from the first wavelength band. The dark-color modules are configured to exhibit dark-color reflectance properties (to reflect light in a dark color), when radiated with the light of the first or second wavelength band. Specifically, the modules configuring the code region 20 are each configured by coating an ordinarily used normal ink.

The covering 11 is arranged so as to cover a specified area 24 that is a predetermined area in the code region 20. This specified area 24 includes a region that disables decoding of the code region 20 when light is shielded. Preferably, the specified area 24 at least partially includes the plurality of light-color modules. In the present embodiment, the covering 11 is arranged so as to cover a region that includes a semicircular region in a right-side edge portion of the data region 21. For example, the covering is arranged in a region in the code region 20, avoiding the position-detection pattern 22a, 22b and 22c and the format codes 23a, 23b, 23c and 23d. The covering 11 is configured by coating a special ink, such as infrared transmitting ink. When the light of the second wavelength band is radiated to the information code 10, such a special ink transmits the light reflected from the modules configuring the code region 20 but prevents transmission of the light of the first wavelength band. Accordingly, in normal conditions in which visible light is dominant, the specified area 24 of the data region 21 is viewable, as shown in FIG. 2A, being hidden by the covering 11.

The position of the specified area 24 with respect to the code region 20 is determined on the basis of the position-detection patterns 22a, 22b and 22c, the format codes 23a, 23b, 23c and 23d, and the like. Thus, the position of the specified area 24 can be determined for each information code.

(Authenticity Determination Process)

Referring now to a flow diagram shown in FIG. 3, hereinafter is specifically described the authenticity determination process. In the authenticity determination process, the information code 10 configured as described above is used as an information code to determine whether or not an information code that has been read by the information code reading apparatus 40 is an authentic information code.

The term "authentic information code" refers to an information code desired and set by a user who prepares the information code or allocates the information code to an article, and thus refers to an information code that is not fraudulently processed, or falsified, against the user's intention.

FIG. 3 is a flow diagram illustrating the authenticity determination process performed by the control unit 41 in the first embodiment.

Prior to the start of the authenticity determination process, an information code to be subjected to authenticity determination is brought to a predetermined position near a reading part (not shown) of the information code reading apparatus 40. In this state, when a predetermined operation is given to the operation section 47, the authenticity determination process is started by the control unit 41. First, at step S101, first radiation is performed. Specifically, at step S101, first illumination light is radiated to the information code from the first illumination source 43 via the reading part. Then, control proceeds to step S103 where an image is picked up. Specifically, at step S103, the imager 42 picks up the image of the information code as a first code image, in a state where the first illumination light is radiated to the information code but the second illumination light is not radiated thereto.

Then, at step S105, position-detection patterns are extracted. Specifically, at step S105, in the first code image picked up as mentioned above, the position-detection patterns 22a, 22b and 22c are detected using a well-known detection method. Then, at step S107, it is determined whether or not the position-detection patterns have been successfully extracted. If the information code imaged at step S103 is a bar code or the like having no position-detection patterns, or if anything that is not an information code has been imaged at step S103, detection of the position-detection patterns is determined to be unsuccessful (No at step S107). In this case, it is determined that an authentic information code has not been read and the authenticity determination process is ended. At step S105 mentioned above, the position-detection patterns to be extracted are not limited to the position-detection patterns 22a, 22b and 22c configuring the QR Code™, but may be position-detection patterns of a different type of code.

On the other hand, if it is determined, at step S105, that the position-detection patterns 22a, 22b and 22c have been successfully detected in the first code image (Yes at step S107), control proceeds to step S109. At step S109, it is determined whether or not the region corresponding to the specified area 24 in the first code image is entirely a dark-color region.

The specified area 24 of the first code image may be determined as not entirely being a dark-color region because it is not covered with the covering 11 or the like, but may be determined as having an array of a plurality of light-color modules and dark-color modules based on which data can be read (No at step S109). In this case, the information code is determined to be a normal information code which is not used for determining authenticity (No at step S109), and control proceeds to step S111. At step S111, the first code image is decoded using a well-known method specific to the type of the code. The control unit 41 that makes a determination at step S109 functions as the "first determining means". The control unit 41 that performs decoding at step S111 and also performs decoding at step S123, which will be described later, functions as the "decoding means".

If the decoding, at step S111, of character data and the like encoded as an information code is determined to be successful (Yes at step S113), control proceeds to step S115 where a first notification is given. Specifically, at step S115, a notification is indicated on the liquid crystal display of the display section 46, the notification being that the imaged information code is not an information code for determining authenticity but is a normal information code. Then, control proceeds to step S117 where data is outputted. Specifically, at step S117, the character data and the like acquired as a result of the decoding at step S111 is outputted to a higher-order system, such as an external device, via an communication interface 48. On the other hand, if it is determined that the decoding at step S111 has been unsuccessful (No at step S113), the present authenticity determination process is ended without performing the processings at step S115 and the subsequent steps.

On the other hand, the specified area 24 of the first code image may be determined as being covered with the covering 11 or the like and the region may be determined as being entirely a dark-color region (Yes at step S109). In this case, no data can be read from the specified area 24, and therefore control proceeds to step S119 where a second radiation is performed. Specifically, at step S119, second illumination light is radiated by the second illumination source 44 to the information code via the reading part. Then, control proceeds to step S121 where an image is picked up. Specifically, at step S121, an image of the information code is picked up as a second code image by the imager 42 in a state of being radiated with the second illumination light.

Then, decoding is performed at step S123 on the basis of the second code image picked up at step S121. Then, at step S125, it is determined whether or not the decoding based on the second code image has been successful. If the second code image picked up at step S121 is the one as shown in FIG. 2B, the character data and the like is decoded on the basis of the array of the modules in the code region 20 of the second code image and the decoding is determined to be successful (Yes at step S125). Then, control proceeds to step S127 where a second notification is given. Specifically, at step S127, a notification is indicated on the liquid crystal display of the display section 46, the notification being that the imaged information code is an authentic information code having the covering 11. Then, control proceeds to step S117 where data is outputted. Specifically, at step S117, the character data and the like acquired as a result of the decoding at step S123 is outputted to a higher-order system, such as an external device, via the communication interface 48. After that, the present authenticity determination process is ended. The control unit 41 that makes a determination at step S125 functions as the "second determining means".

On the other hand, if the information code is the one in which the region corresponding to the specified area 24 is not covered with the covering 11, such as an information code in which the region corresponding to the specified area 24 is coated with the same ink as that of the code region, the second code image as shown in FIG. 2A is picked up at step S121 and the decoding at step S123 is determined to be unsuccessful (No at step S125). In this case, control proceeds to step S129 where a third notification is given. Specifically, at step S129, a notification is indicated on the liquid crystal display of the display section 46, the notification being that the information code imaged at step S121 is an information code different from an authentic information code (which may be an inauthentic information code). After that, the present authenticity determination process is ended.

In this way, in the authenticity determination process, when the information code 10 having the covering 11 is imaged, the information code 10 is determined (notified) to be an authentic information code. When an information code in which the specified area 24 is not covered with the covering 11 is imaged, the information code is determined (notified) not to be an authentic information code.

When the information code 10 is attempted to be copied for fraudulent purposes, the information code 10 cannot be correctly copied unless the covering 11 is coated with a special ink different from that of the code region 20. A fraudulent code obtained by simply copying the information code 10 is visually recognized to be similar to the information code 10, in a normal state where visible light is dominant. However, in the second code image of the fraudulent code picked up with the radiation of the second illumination light, no data can be retrieved from the specified area 24. Accordingly, the information code 10 cannot be decoded.

Therefore, in order to prevent fraudulent use of an information code at a gate, for example, where entrance and exit are managed, it is desirable that the information code reading apparatus 40 is used at the gate and that the information code 10 is used as an information code to be read at the time of entrance and exit. Thus, when an information code copied for fraudulent purposes is held over the information code reading apparatus 40 at the gate, the information code can be determined (notified) not to be an authentic information code.

Use of the information code 10 and the information code reading apparatus 40 is not limited to giving notification at a gate as to the use of an information code copied for fraudulent purposes, at the time of entrance and exit. The information code 10 and the information code reading apparatus 40 may be used such as in an information management system, as a safeguard against the use of an information code copied for fraudulent purposes.

As described so far, in the information code 10 according to the present embodiment, the specified area 24, that is a predetermined area in the code region 20, is covered with the covering 11 to shield light and thus decoding of the information code 10 is disabled. The specified area 24 transmits the light of the second wavelength band but exhibits reflectance properties of dark color when the light of the first wavelength band is radiated thereto.

Thus, the information code 10 in which the specified area 24 has a dark color in the first code image but can be decoded on the basis of the second code image can be determined to be an authentic information code having the covering 11. On the other hand, an information code can be determined to be, at least, an information code different from the authentic information code (for example, an inauthentic information code), when the information code corresponds to one that cannot be decoded in the second code image as well, such as a fraudulent code obtained by fraudulently falsifying an authentic information code having the covering 11, or an information code in which the area corresponding to the specified area 24 is simply dirty, or a generally used information code that can be decoded on the basis of the first code image.

Thus, the authenticity determination is facilitated for the information code 10 having the covering 11.

In the information code reading apparatus 40 according to the present embodiment, after the specified area 24 in the first code image is determined to have a dark color at step S109, a determination at step S125 is made. At step S125, when the code region 20 has been decoded at step S123 on the basis of the second code image, the information code 10 having the covering 11 is determined as having been successfully decoded.

Thus, when an image of the information code 10 configured as described above is picked up by the imager 42, the specified area 24 in the first code image should have a dark color and the code region 20 should be determined as having been decoded on the basis of the second code image. Therefore, the imaged information code can be determined to be an authentic information code having the covering 11. On the other hand, when an image of a fraudulently copied information code is picked up, decoding based on the second code image is disabled as well. Therefore, the imaged information code can be determined to be an information code different from the authentic information code.

In this way, the information reading apparatus 40 is realized, in which authenticity determination is facilitated using an information code having the covering 11.

Figure 4:
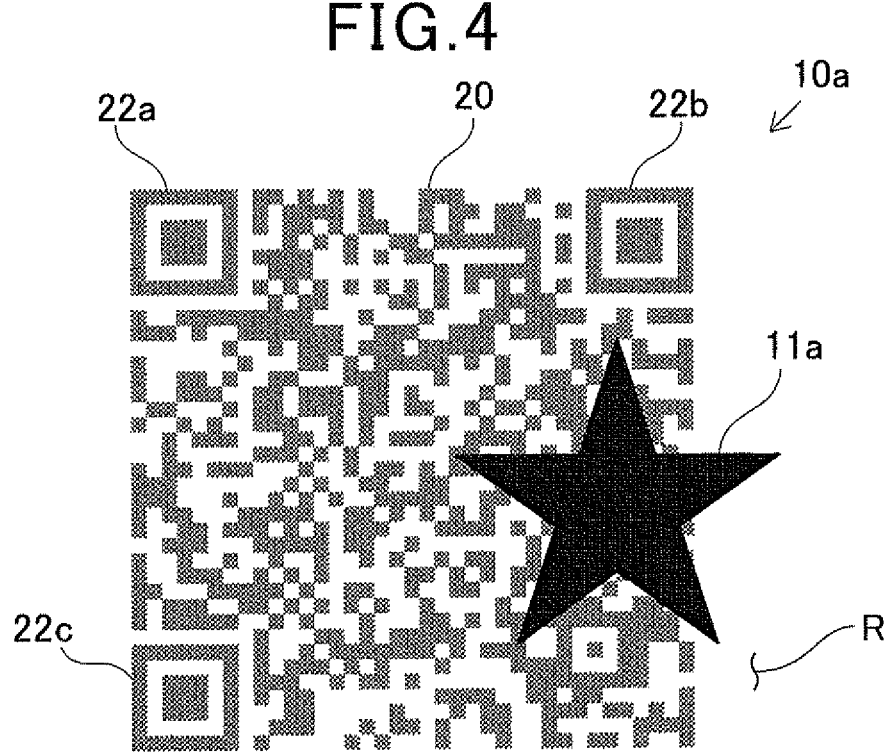
FIG. 4 is an explanatory diagram illustrating an example of an information code, according to a modification of the first embodiment.

FIG. 4 is an explanatory diagram illustrating an example of an information code 10a having a covering 11a, which is a modification of the first embodiment. In FIG. 4, dark-color modules in the same dark color as that of the covering 11a are shown in a color lighter than that of the covering 11a, i.e. shown in a gray color, for the sake of descriptive convenience. The information code 10a that is a modification of the first embodiment may use the covering 11a having an improved design, replacing the covering 11. For example, as shown in FIG. 4, the covering 11a is formed as an arbitrary graphic, such as a star shape, having a design suitable for the environment of usage.

When the covering 11a is configured with an arbitrary graphic as well, the information code can be used as an information code for determining authenticity, which can be decode in a state where the light of the second wavelength band is radiated. Thus, the information code 10a is realized which not only facilitates authenticity determination but also has improved design. The design of the covering 11a is not limited to the star shape. The covering 11a may be formed as an arbitrary graphic having an arbitrary design, with the shape, the pattern and the color being changed according to the environment of usage. In this case as well, the advantages as described above can be enjoyed.

Second Embodiment

Figure 5A:
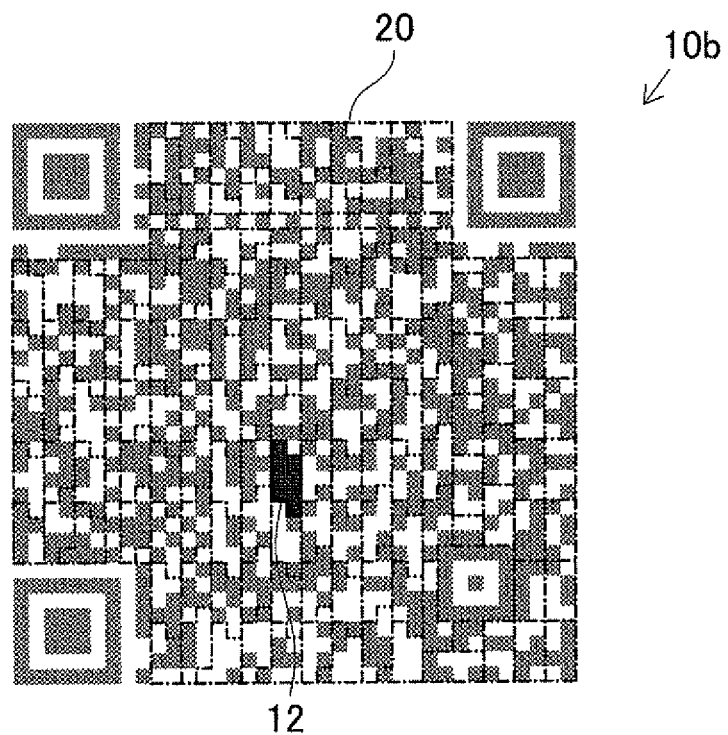
FIG. 5A is an explanatory diagram illustrating an example of an information code, according to a second embodiment of the present invention.
Figure 5B:
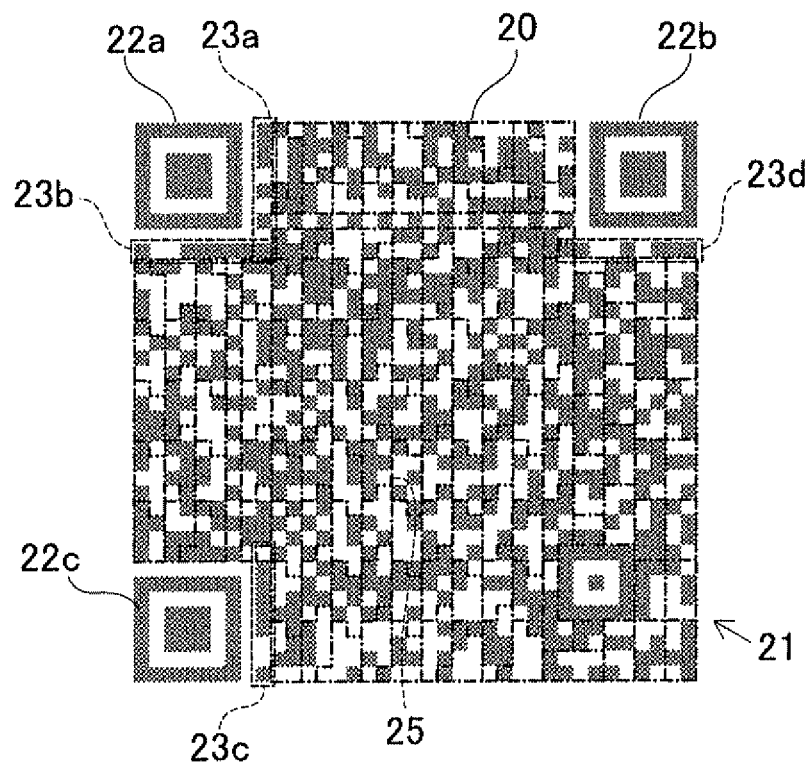
FIG. 5B is an explanatory diagram illustrating a state where a covering has been removed from the information code illustrated in FIG. 5A.
Figure 6:
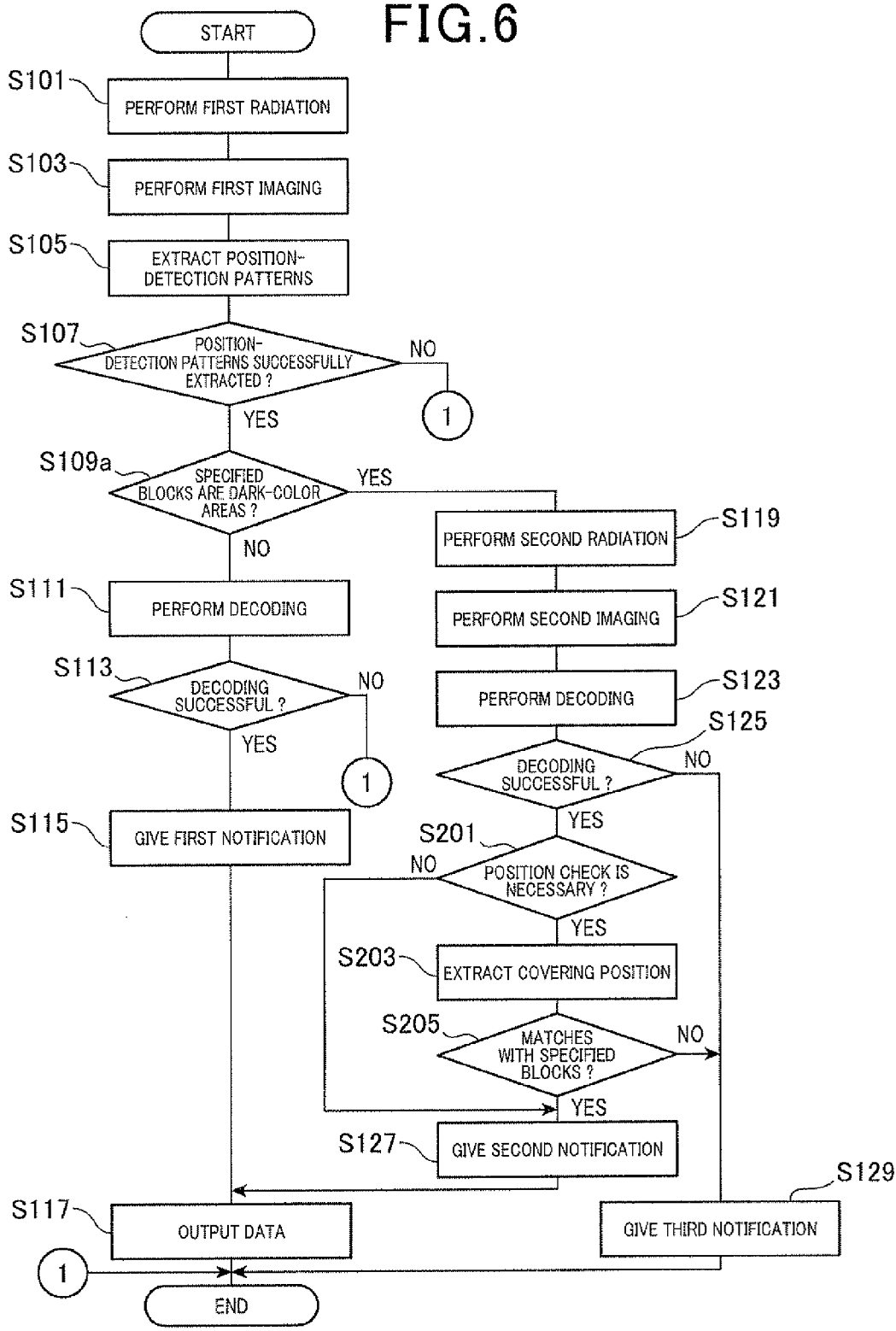
FIG. 6 is a flow diagram illustrating an authenticity determination process performed by a control unit, according to the second embodiment.

Referring now to FIGS. 5A, 5B and 6, hereinafter is described a second embodiment related to the information code and the information code reading apparatus of the present invention.

In the second and the subsequent embodiments, the components identical with or similar to those in the first embodiment are given the same reference numerals for the sake of omitting unnecessary explanation.

FIG. 5A is an explanatory diagram illustrating an example of an information code 10b having a covering 12, according to the second embodiment. FIG. 5B is an explanatory diagram illustrating a state where the covering 12 has been removed from the information code 10b. FIG. 6 is a flow diagram illustrating an authenticity determination process executed by the control unit 41 in the second embodiment. In FIGS. 5A and 5B, dark-color modules in the same dark color as that of the covering 12 are shown in a color lighter than that of the covering 12, i.e. shown in a gray color, for the sake of descriptive convenience.

The information code 10b of the second embodiment is different from the information code of the first embodiment in that one of blocks configuring the code region 20 is used as a specified block 25 and covered with the covering 12.

As shown in FIGS. 5A and 5B, the data region 21 of the code region 20 includes a plurality of adjacently located blocks, each of which is configured by several light-color modules and dark-color modules. Each block is divided into a data code block and an error-correction code block. As shown in FIGS. 5A and 5B, each block is shown in an area enclosed by a dot-dash line. As shown, each block is mainly configured by eight modules which are arrayed in a 4-row and 2-column matrix. However, this should not impose a limitation. Each block may have a different number of modules and a different block configuration.

In the data code block, encoded data (data codewords) to be decoded is expressed by a plurality of cells (also referred to as modules). The error-correction code block is configured by error-correction codewords for correcting an error of the data code block. The error-correction codewords configuring the error-correction code block are produced using a well-known error-correction process, on the basis of the encoded data (data codewords) configuring the data code block.

In the present embodiment, one of the plurality of error-correction code blocks mentioned above is covered, as the specified block 25, with the covering 12 to configure the information code 10b. The information concerning the position of the specified block 25 in the code region 20 or the information concerning the position check, which will be described later, is determined on the basis of the position-detection patterns 22a, 22b, and 22c, and the format codes 23a, 23b, 23c and 23d. The information concerning the position of the specified block 25 or the information concerning the position check can be changed for each information code. The specified block 25 corresponds to an example of the "specified area".

Referring to the flow diagram shown in FIG. 6, hereinafter is specifically described the authenticity determination process according to the present embodiment. In the authenticity determination process, the control unit 41 determines whether or not an information code read by the information code reading apparatus 40 is an authentic information code, using the information code 10b configured as described above as an information code for determining authenticity.

Similar to the first embodiment described above, when the position-detection patterns 22a, 22b and 22c are detected from the first code image (Yes at step S107), control proceeds to step S109a. At step S109a, it is determined whether or not the block corresponding to the specified block 25 in a first code image is entirely a dark-color area.

If the specified block 25 in the first code image is covered such as with the covering 12 and is entirely a dark-color area (Yes at step S109a), no data can be read from the specified block 25. Therefore, control proceeds to step S119 where a second radiation is performed. Then, in a state where a second illumination light is radiated, an image of the information code is picked up by the imager 42 as a second code image (step S121). Then, decoding is performed on the basis of the second code image (step S123).

When the decoding is successful (Yes at step S125), control proceeds to step S201. At step S201, it is determined whether or not the position of the covering formed of a special ink is required to be checked. If the information that the position of the covering is required to be checked is obtained on the basis such as of the position-detection patterns 22a, 22b, and 22c detected at step S105 and the format codes 23a, 23b, 23c and 23d (Yes at step S201), control proceeds to step S203 where the position of the covering is extracted. Specifically, at step S203, the position of the covering in the code region 20 is extracted on the basis of a difference between the first and second code images, i.e. extracted by calculating a difference in a pixel value between the first and second code images.

If the area of the extracted covering matches the area of the specified block 25 (Yes at step S205), an image of the information code 10b having the covering 12 is regarded as having been picked up, and control proceeds to step S127 where a second notification is given. Specifically, at step S127, a notification is indicated in a liquid crystal display of the display section 46, the notification being that the imaged information code is an authentic information code having the covering 12. If the information that the position of the covering is not required to be checked is obtained on the basis such as of the position-detection patterns 22a, 22b, and 22c detected at step S105 and the format codes 23a, 23b, 23c and 23d as well (No at step S201), the second notification mentioned above is given.

On the other hand, if the extracted area of the covering does not match the area of the specified block 25 (No at step S205), a wide region including the specified block 25 is regarded to be covered such as with taints of the ink corresponding to the special ink, and control proceeds to step S129 where a third notification is given. At step 121, when an image of the information code, in which the specified block 25 is coated with the same ink as that of the code region, is picked up in a state where the second illumination light is radiated to the information code, the second code image as illustrated in FIG. 5A is obtained. In this case, the decoding at step S123 will be unsuccessful (No at step S125). In this case as well, the third notification is given.

In this way, similar to the information code 10 of the first embodiment, authenticity determination is facilitated for the information code 10b in which the specified block 25 that is one of the blocks configuring the code region 20 is covered with the covering 12. Thus, the information code reading apparatus 40 is realized, in which authenticity determination is facilitated using the information code 10b.

In the present embodiment, one of the plurality of error-correction code blocks is covered, as the specified block 25, with the covering 12. However, this should not impose a limitation. One of the plurality of data code blocks may alternatively be covered, as the specified block 25, with the covering 12.

Third Embodiment

Figure 7A:
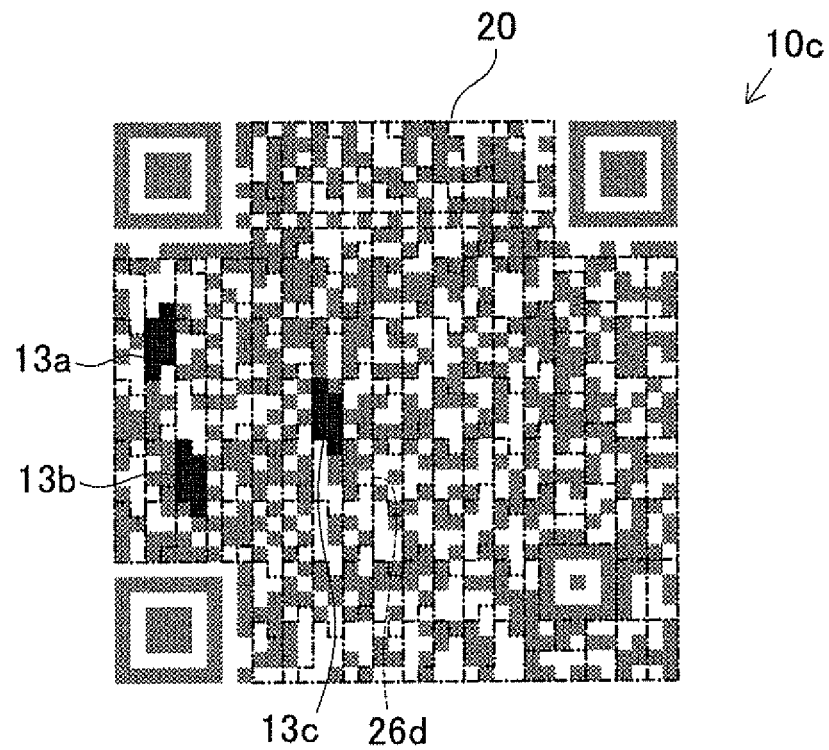
FIG. 7A is an explanatory diagram illustrating an example of an information code, according to a third embodiment of the present invention.
Figure 7B:
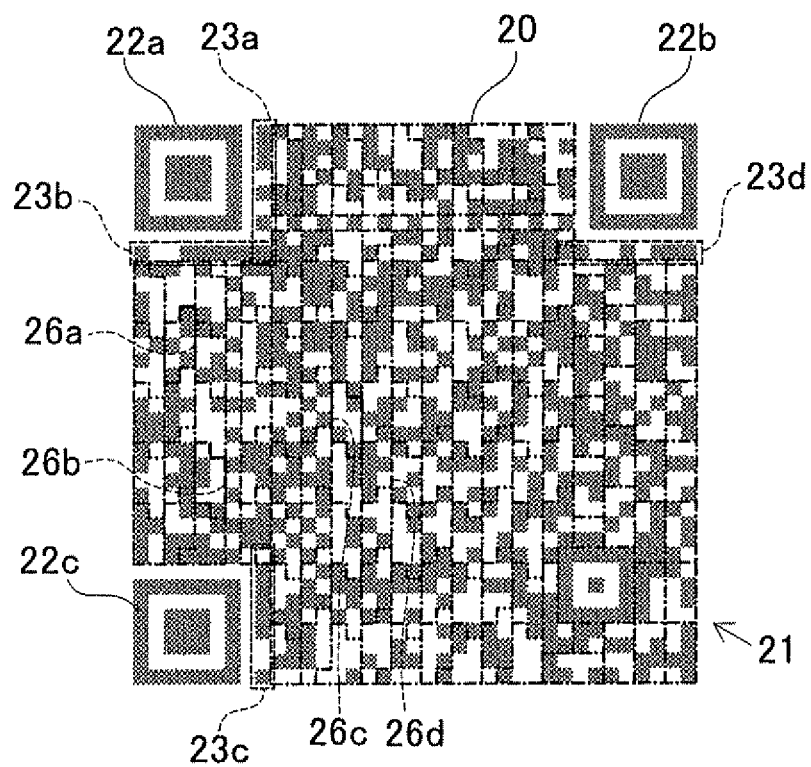
FIG. 7B is an explanatory diagram illustrating a state where coverings have been removed from the information code illustrated in FIG. 7A.
Figure 8:
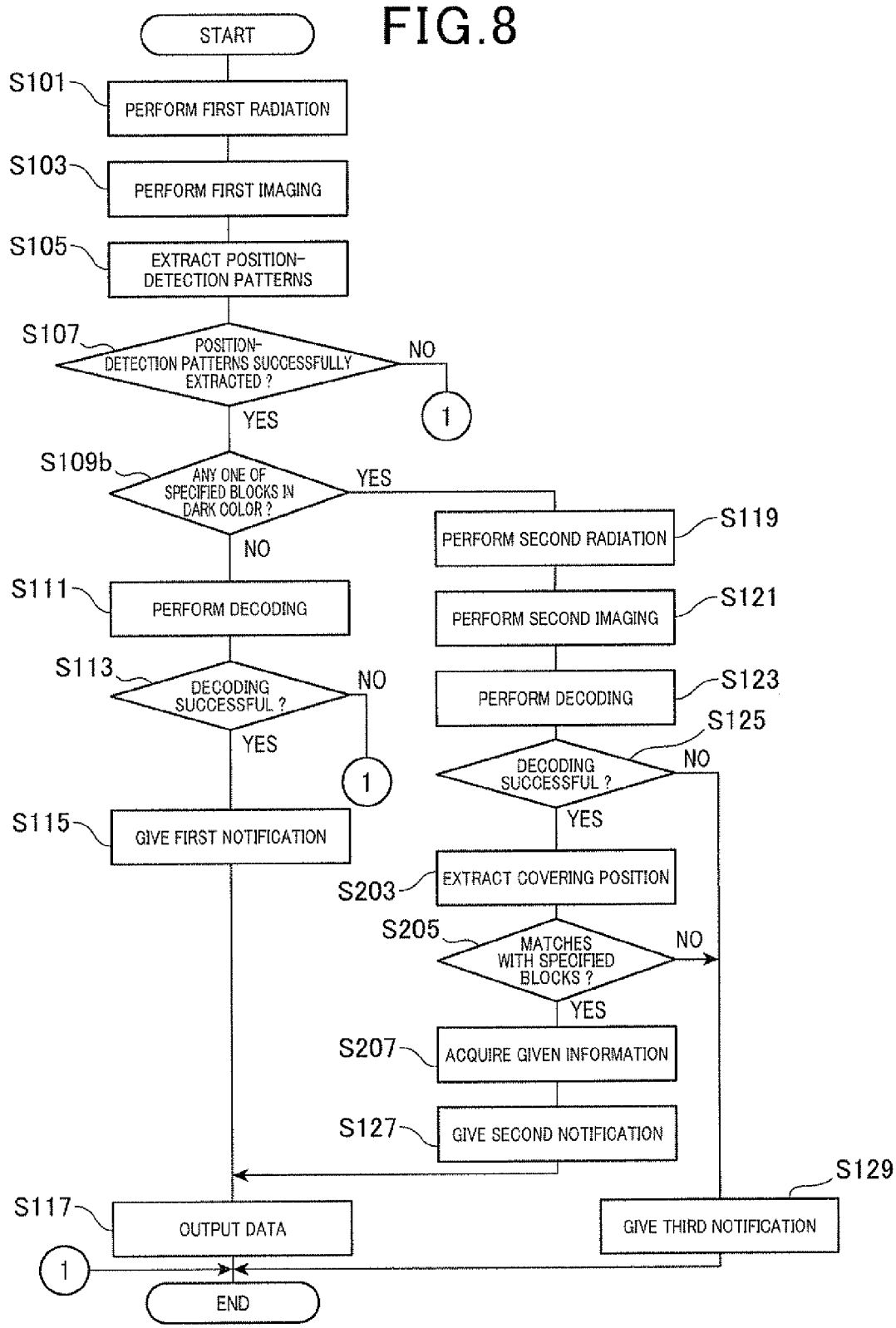
FIG. 8 is a flow diagram illustrating an authenticity determination process performed by a control unit, according to the third embodiment.

With reference to FIGS. 7A, 7B and 8, hereinafter is described a third embodiment in which the information code and the information reading apparatus of the present invention are implemented.

FIG. 7A is an explanatory diagram illustrating an example of an information code 10c having coverings 13a, 13b and 13c, according to the third embodiment. FIG. 7B is an explanatory diagram illustrating a state where the coverings 13a, 13b and 13c have been removed from the information code 10c. FIG. 8 is a flow diagram illustrating an authenticity determination process performed by the control unit 41, according to the third embodiment. In FIGS. 7A and 7B, dark-color modules in the same dark color as that of the coverings 13a, 13b and 13c are shown in a color lighter than that of the coverings 13a, 13b and 13c, i.e. shown in a gray color, for the sake of descriptive convenience.

The information code 10c of the third embodiment is different from the information code of the second embodiment in that a plurality of blocks among the blocks configuring the code region 20 are covered with coverings.

As shown in FIGS. 7A and 7B, in the information code 10c, four blocks out of the error-correction code blocks configuring the code region 20 are set as specified blocks 26a, 26b, 26c and 26d. Of the specified blocks 26a, 26b, 26c and 26d, the specified blocks 26a, 26b and 26c are ensured to be covered with the coverings 13a, 13b and 13c, respectively. At least one of the specified blocks 26a, 26b, 26c and 26d is ensured to be covered with a covering.

Which of the specified blocks 26a, 26b, 26c and 26d are covered with coverings is predetermined on the basis of given information. Accordingly, the given information can be acquired by defining the positions of the specified blocks covered with the coverings. In other words, the given information to be available can be changed according to the mode of coverings, such as a mode in which all of the specified blocks 26a, 26b, 26c and 26d are covered with coverings, or a mode in which the specified blocks 26a, 26b and 26c are covered with coverings, or a mode in which the specified blocks 26a, 26b and 26d are covered with coverings. The given information includes, for example, information for enhancing the accuracy of determination made in the authenticity determination process, or a password used for reading the information code 10c. The specified blocks 26a, 26b, 26c and 26d correspond to an example of the "plurality of specified areas".

The authenticity determination process of the present embodiment is specifically described below referring to the flow diagram of FIG. 8. In the authenticity determination process, the information code 10c configured as described above is used as an information code for determining authenticity. Also, in the process, the control unit 41 determines whether or not the information code read by the information code reading apparatus 40 is an authentic information code.

Similar to the second embodiment, when the position-detection patterns 22a, 22b and 22c are detected from a first code image (Yes at step S107), control proceeds to step S109b. At step S109b, it is determined whether or not at least one of the specified blocks 26a, 26b, 26c and 26d in the first code image is entirely a dark-color area.

If at least one of the specified blocks 26a, 26b, 26c and 26d is covered with the covering 13a, 13b or 13c and is entirely a dark-color area (Yes at step S109), control proceeds to step S119 where a second radiation process is performed. Then, in a state of being radiated with the second illumination light, an image of the information code is picked up as a second code image by the imager 42 (step S121). Then, based on the second code image, decoding is performed (step S123).

If the decoding is determined to be successful (Yes at step S125), control proceeds to step S203 where covering positions are extracted. Specifically, at step S203, the positions of the coverings in the code region 20 are extracted on the basis of the difference between the first and second code images. If the extracted positions (areas) of the coverings match any one of or all of the areas of the specified blocks 26a, 26b, 26c and 26d (Yes at step S205), the information code 10c having the coverings 13a, 13b and 13c is regarded as having been imaged. Then, at step S207, the given information is acquired. On the other hand, if at least one of the areas of the extracted coverings does not match the areas of the specified blocks 26a, 26b, 26c and 26d (No at step S205), a wide region including the specified blocks 26a, 26b, 26c and 26d is regarded to be covered such as with taints of the ink corresponding to the special ink. Then, control proceeds to step S129 where a third notification is given.

At step S207 of acquiring the given information, the positions of the coverings extracted at step S203, i.e. the positions of the specified blocks covered with coverings, are defined to acquire the given information. In the image of the information code 10c shown in FIG. 7A, the specified blocks 26a, 26b and 26c among the specified blocks 26a, 26b, 26c and 26d are covered with the covering 13a, 13b and 13c, respectively. Thus, the given information corresponding to the mode of coverings can be acquired. After that, control proceeds to step S127 where a second notification is given. Specifically, at step S127, a notification is indicated on the liquid crystal display of the display section 46, the notification being that the imaged information code is an authentic information code having the coverings 13a, 13b and 13c. The control unit 41 that acquires the given information at step S207 functions as the "acquiring means".

On the other hand, the information code may be one in which none of the areas corresponding to the specified blocks 26a, 26b, 26c and 26d is covered with a covering. For example, in the information code, the areas corresponding to the specified blocks 26a, 26b, 26c and 26d may be coated with the same ink as that of the code region. When such an information code is imaged in a state of being radiated with the second illumination light, the second code image as shown in FIG. 7A is picked up. In this case, the decoding at step S123 is unsuccessful (No at step S125). In this case, control proceeds to step S129 where a third notification is given. Specifically, at step S129, a notification is indicated on the liquid crystal display of the display section 46, the notification being that the imaged information code is an information code different from an authentic information code (which may be an inauthentic information code).

As described above, in the information code 10c according to the present embodiment, the plurality of specified blocks 26a, 26b, 26c and 26d as specified areas are provided at a plurality of positions in the code region 20. Also, the coverings (13a, 13b and 13c) are arranged so as to cover at least one of the specified blocks 26a, 26b, 26c and 26d. Thus, the degree of freedom is enhanced in arranging the coverings.

Of the specified blocks 26a, 26b, 26c and 26d, the ones to be covered with the coverings (13a, 13b and 13c) are determined on the basis of the given information. Accordingly, the given information can be acquired by determining whether or not the specified blocks 26a, 26b, 26c and 26d have a dark-color in the first image code, followed by reading blocks, among these specified blocks, which are covered with the coverings (13a, 13b and 13c). In this way, in the information code 10c having the coverings (13a, 13b and 13c), the amount of information can be increased.

In the information code reading apparatus 40 according to the present embodiment, it is determined at step S109b, whether or not any one of the specified blocks 26a, 26b, 26c and 26d in the first code image is a dark-color area. If there is a dark-color area, it is then determined, at step S125, that whether the code region 20 has been decoded on the basis of the second code image. If the code region 20 has been decoded, the information code 10c having the coverings (13a, 13b and 13c) is determined as having been decoded. Then, the given information is acquired on the basis of the areas covered with the coverings (13a, 13b and 13c) that are calculated from the difference between the first and second code images.

In the configuration described above as well, the advantages similar to those of the information code reading apparatus 40 according to the first embodiment can be enjoyed. In particular, it is determined whether or not the specified areas in the first code image have a dark color, and then, of the specified blocks 26a, 26b, 26c and 26d, the ones covered with the coverings (13a, 13b, and 13c) are read. The given information can be acquired in this way and, in reading the information code 10c, the amount of available information can be increased.

Fourth Embodiment

Referring now to FIGS. 9A, 9B, 10 and 11, hereinafter is described a fourth embodiment related to the information code and the information code reading apparatus of the present invention.

Figure 9A:
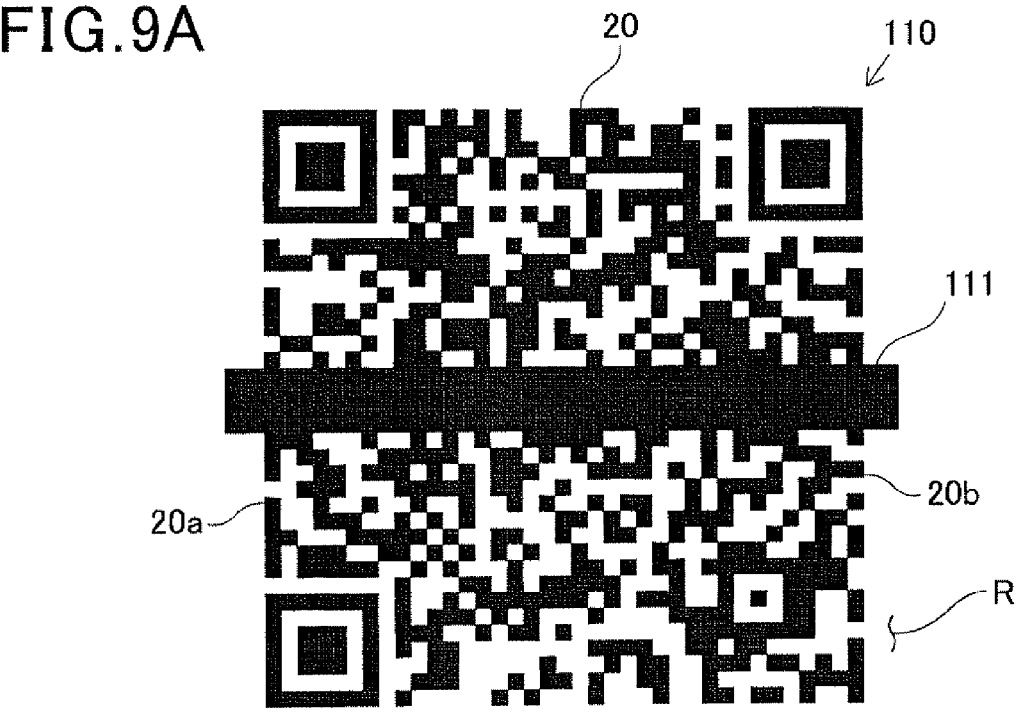
FIG. 9A is an explanatory diagram illustrating an example of an information code, according to a fourth embodiment of the present invention.
Figure 9B:
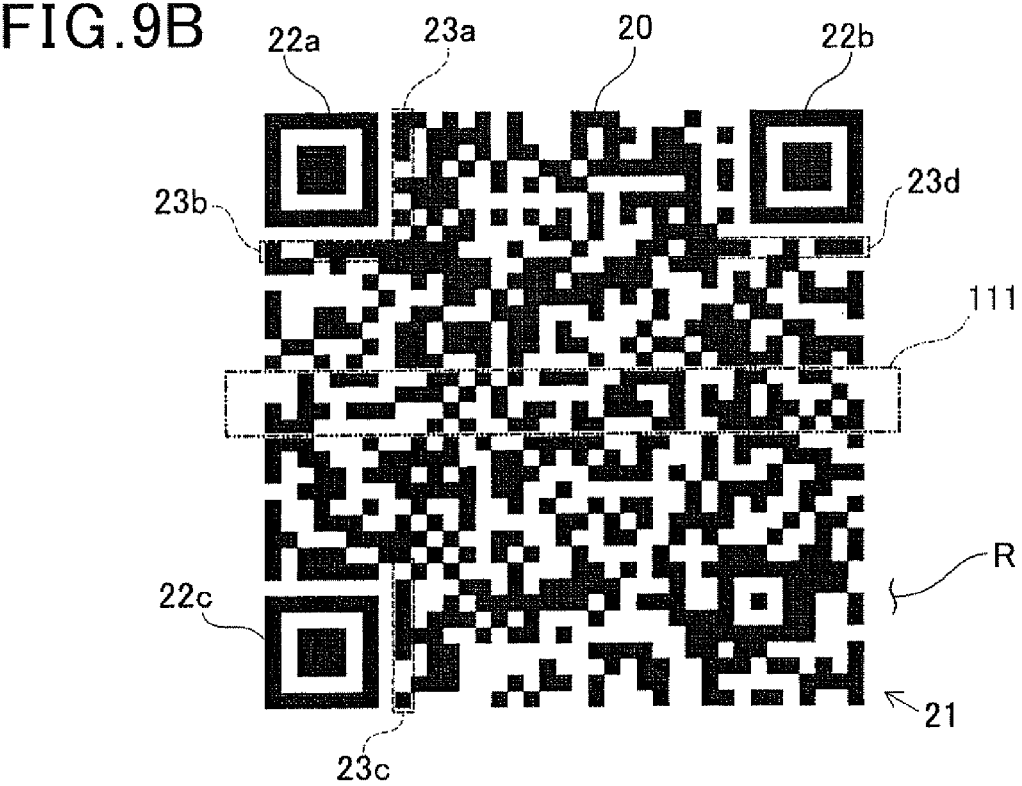
FIG. 9B is an explanatory diagram illustrating a state where a covering has been removed from the information code illustrated in FIG. 9A.

In the present embodiment, an information code 110 shown in FIGS. 9A and 9B is read by the information code reading apparatus 40. The apparatus 40 has the same configuration as that of each of the embodiments described above, except the authenticity determination process performed by the control unit 41.

(Information Code)

FIG. 9A is an explanatory diagram illustrating an example of the information code 110 having a covering 111, according to the present embodiment. FIG. 9B is an explanatory diagram illustrating a state where the covering 111 has been removed from the information code 110 illustrated in FIG. 9A.

As shown in FIG. 9A, the information code 110 includes the code region 20 and the covering 111. In the code region 20, a plurality of light-color modules and dark-color modules are arrayed. The covering 111 partially covers the code region 20. As shown in FIG. 9B, similar to a QR Code™, the code region 20 is configured as a rectangular region as a whole, in which a plurality of light-color and dark-color modules, each being a square area, are arrayed in a matrix.

In the code region 20, the covering 111 is arranged in the data region 21 avoiding the position-detection patterns 22a, 22b and 22c and the format codes 23a, 23b, 23c and 23d. Specifically, the covering 111 is arranged, being extended in a band-like shape from one edge 20a that is a line defining the code region 20 from the background to the other edge 20b, continuously covering the data region 21.

(Authenticity Determination Process)

The information code 110 configured as described above can be used as an authentic information code for determining authenticity. The authenticity of the information code 110, per se, can also be determined using the information code 110. Further, the authenticity of an article, on which the information code 110 is put, can be determined through the authenticity determination of the information code 110.

Referring to the flow diagram shown in FIG. 10, hereinafter is specifically described the authenticity determination process for determining whether or not an information code read by the information code reading apparatus 40 is an authentic information code.

The authenticity determination process shown in FIG. 10 is performed by the control unit 41 in the present embodiment.

Figure 11:
FIG. 11 is an explanatory diagram illustrating an image difference between a first code image illustrated in FIG. 9A and a second code image illustrated in FIG. 9B.

FIG. 11 is an explanatory diagram illustrating a difference between a first code image shown in FIG. 9A and a second code image shown in FIG. 9B (i.e. an image obtained by differentiating the values of corresponding pixels between the first and second code images). In FIG. 11, dark-color modules corresponding to the area having no image differential values are shown in a color lighter than that of the area having image differential values, for the sake of descriptive convenience.

The authenticity determination process is started by the control unit 41 when a predetermined operation is given to the operation section 47 in a state where an information code to be determined as to its authenticity is brought close to a predetermined position with respect to a reading part (not shown) of the information code reading apparatus 40. First, at step S201, a first radiation is performed. Specifically, at step S201, the first illumination light is radiated to the information code via the reading part by the first illumination source 43. Then, control proceeds to step S203 where a first imaging is performed. Specifically, at step S203, the information code is imaged as a first code image by the imager 42, in a state where the first illumination light is radiated but the second illumination light is not radiated thereto.

Then, at step S205, position-detection patterns are extracted. Specifically, at step S205, a well-known method is used to detect the position-detection patterns 22a, 22b and 22c in the first code image picked up as mentioned above. If the information code imaged at step S203 is a code or the like having no position-detection patterns, or something which is not an information code, detection of the position-detection patterns is determined to be unsuccessful (No at step S207), and the present authenticity determination process is ended because an authentic information code has not been read. At step 205 of extracting position-detection patterns, position-detection patterns to be detected are not limited to the position-detection patterns 22a, 22b and 22c configuring a QR Code™, but may be other position-detection patterns of a code of a different type.

On the other hand, if the position-detection patterns 22a, 22b and 22c are successfully extracted, at step S205, from the first code image (Yes at step S207), control proceeds to step S209 where a second radiation is performed. Specifically, at step S209, the second illumination light is radiated to the information code via the reading part by the second illumination source 44. Then, at step S211, a second imaging is performed. Specifically, at step S211, the information code is imaged as a second code image by the imager 42, in a state where the second illumination light is radiated thereto.

Then, at step S213, decoding is performed on the basis of the second code image. Specifically, at step S213, the second code image is decoded using a well-known method specific to the type of the code. The control unit 41 that performs the decoding at step S213 corresponds to an example of the "decoding means".

If it is determined that the decoding, at step S213, such as of encoded character data as an information code has been successful (Yes at step S215), control proceeds to step S217 where a difference is detected. Specifically, at step S217, a difference between the first code image picked up by performing first imaging and the second code image picked up by performing the second imaging is detected as an image difference. More specifically, the first and second code images are superposed by bringing the position-detection patterns 22a, 22b and 22c in the first code image into alignment with those in the second code image. If any area having a different color is found through the superposition, the area is detected as an image difference. Thus, through the imaging of the information code 110, the first and second code images as shown in FIGS. 9A and 96, respectively, are obtained. Then, as shown in FIG. 11, the area corresponding to light-color modules in the code region 20 covered with the covering 111 is detected as an image difference. The control unit 41 that detects a difference at step S217 functions as the "difference detecting means".

Thus, if an image difference is detected, an affirmative determination is made at step S219 and control proceeds to step S221 where a first notification is given. Specifically, at step S221, a notification is indicated on the liquid crystal display of the display section 46, the notification being that the imaged information code is an authentic information code having the covering 111. Then, at step S223, data is outputted. Specifically, at step S223, the character data and the like acquired at step S213 of performing decoding is outputted to the higher-order system, such as an external device, via the communication interface 48. Then, the present authenticity determination process is ended. The control unit 41 that makes a determination at step S219 corresponds to an example of the "determining means".

On the other hand, if a normal information code having no covering 111 is imaged and the decoding is successful, no image difference is detected because the first and second code images picked by performing the first and second imagings, respectively, are determined to be the same (No at step S219). Accordingly, control proceeds to step S225 where a second notification is given. Specifically, at step S225, a notification is indicated on the liquid crystal display of the display section 46, the notification being that the imaged information code is an information code different from an authentic information code. Then, at step S223, data is outputted. Specifically, at step S223, the character data and the like acquired at step S213 of performing decoding is outputted to the higher-order system, such as an external device, via the communication interface 48. Then, the present authenticity determination process is ended.

If the decoding based on the second code image is determined to be unsuccessful (No at step S215), control proceeds to step S227 where a third notification is given. Specifically, at step S227, a notification similar to the second notification is indicated on the liquid crystal display of the display section 46, the notification being that the imaged information code is an information code different from an authentic information code (which may be an inauthentic information code). After that, the present authenticity determination process is ended without outputting the data.

Thus, in the present authenticity determination process, if an image of the information code 110 having the covering 111 is picked up, the information code 110 is determined (notified) as being an authentic information code. On the other hand, an information code of which the decoding has been unsuccessful or an information code from which no image difference is detected is determined (notified) as being an information code which is not an authentic information code.

Should the information code 110 be attempted to be copied for fraudulent purposes, unless the covering 111 is coated with the special ink different from the one used for the code region 20, the information code 110 cannot be correctly copied. In other words, it is true that a fraudulent code obtained by simply copying the information code 110 using a copying machine is visually recognized similar to the (authentic) information code 110 in a normal state where visible light is dominant. However, in a second code image of the fraudulent code picked up by radiating the second illumination light, decoding is disabled (No at step S215) or no image difference is detected (No at step S219) even though decoding may be successful.

In this way, the information code reading apparatus 40 can be used at a gate where exit and entrance is managed, while the information code 110 can be used as an information code to be read at the time of the exit and entrance. In this case, if an information code copied for fraudulent purposes (fraudulent code) is held over the information code reading apparatus 40 at the gate, the fraudulent code is determined (notified) as not being an authentic information code.

Use of the information code 110 and the information code reading apparatus 40 is not limited to the use at a gate where exit and entrance are managed, as a safeguard against the use of an information code that has been copied for fraudulent purposes. The information code 110 and the information code reading apparatus 40 may be used such as in an information management system, as a safeguard against the use of an information code that has been copied for fraudulent purposes.

As described above, in the information code 110 of the present embodiment, the plurality of light-color modules arrayed in the code region 20 are partially covered with the covering 111 that transmits the light of the second wavelength band and has reflection properties of showing up in a dark color when the light of the first wavelength band is radiated.

Thus, an image difference is caused in superposing the first code image of the information code 110 picked up in a state where the light of the first wavelength band is radiated thereto, over the second code image picked up in a state where the light of the second wavelength band is radiated thereto. Therefore, when the information code 110 having the covering 111 is used as an information code for determining authenticity, an information code, from which the difference as described above is detected, is determined to be an authentic information code having the covering 111. On the other hand, an information code, from which no difference as described above is detected, is determined to be an information code different from the authentic information code.

Accordingly, authenticity determination is facilitated for the information code 110 having the covering 111.

In the information code reading apparatus 40 of the present embodiment, an image difference is detected at step S217, the image difference being the difference between the first code image picked up by the imager 42 in a state where the light of the first wavelength band is radiated to the information code, and the second code image picked up by the imager 42 in a state where the light of the second wavelength band is radiated to the information code. Based on the image difference detected at step S217, the presence/absence of the covering 111 is determined.

Thus, when the information code 110 configured as described above is imaged by the imager 42, the covering 111 is determined to be present on the basis of the detected image difference. Accordingly, the imaged information code 110 is determined as being an authentic information code having the covering 111. On the other hand, if a fraudulently copied information code is imaged, the image difference is not detected and thus the information code is determined not to have the covering 111. Accordingly, the imaged information code is determined as being an information code different from the authentic information code.

In this way, the information code reading apparatus 40 is realized, in which authenticity determination is facilitated using the information code 110 having the covering 111.

In particular, the covering 111 is arranged avoiding the position-detection patterns 22a, 22b and 22c for defining positions. Therefore, superposition of the first and second code images is facilitated by bringing the position-detection patterns 22a, 22b and 22c of the first code image into alignment with the position-detection patterns 22a, 22b and 22c of the second code image, respectively. Thus, the difference can be easily detected.

In the authenticity determination process described above, steps S213, S215, S223 and S227 associated with the reading of an information code may be eliminated and specialized solely in a process associated with authenticity determination.

Figure 12:
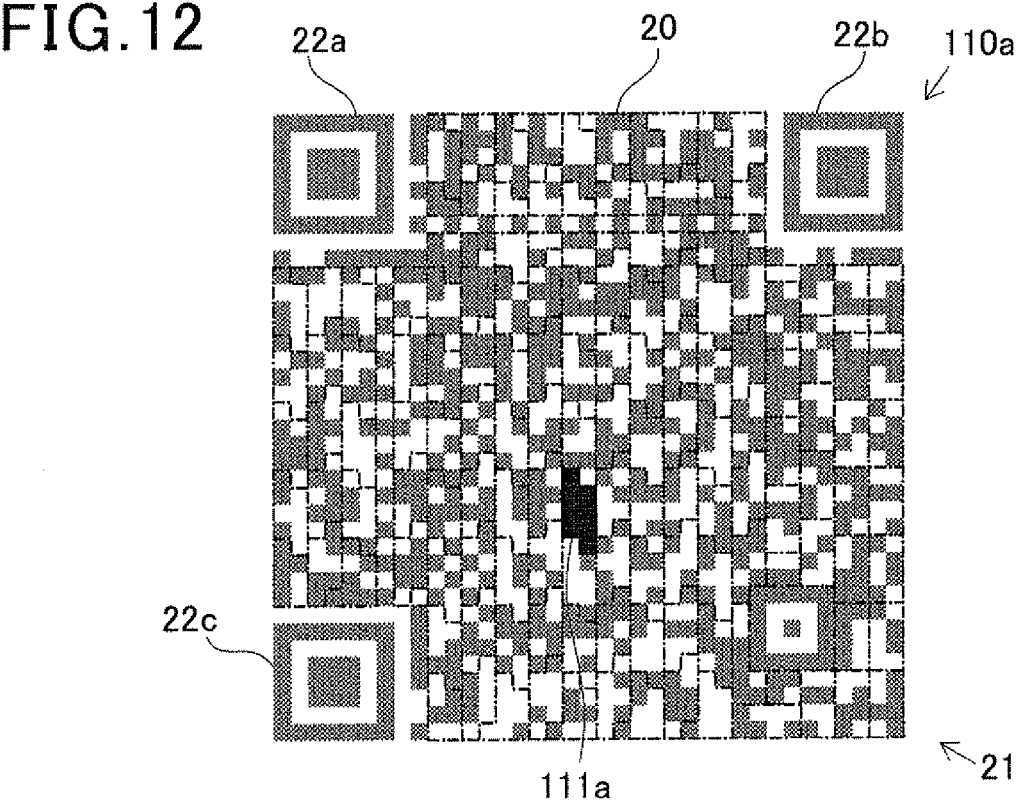
FIG. 12 is an explanatory diagram illustrating an example of an information code, according to a first modification of the fourth embodiment.

Referring now to FIG. 12, hereinafter is described an information code 110a that is a first modification of the present embodiment. FIG. 12 is an explanatory diagram illustrating an example of the information code 110a having a covering 111a, according to the first modification. In FIG. 12, dark-color modules in the same dark color as that of the covering 111*a* are shown in a color lighter than the covering 111*a*, i.e. shown in a gray color, for the sake of descriptive convenience.

The covering 111 described above may be arranged in any area in the code region 20 if the area includes light-color modules. This is because, in superposing the first and second code images, the area of the light-color modules covered with the covering 111 is detected as the image difference.

For example, the covering 111 may be arranged in a less noticeable area in the code region 20 so as to be narrower than the position-detection pattern 22*a*, 22*b* or 22*c*. Thus, in the code region 20, the covering 111 is hardly distinguished from the dark-color modules, so that the fact that the code region 20 is partially covered with the covering 111 can be easily kept secret. Accordingly, a person who has fraudulently copied the information code 110 will hardly notice the presence of the covering 111. Therefore, it is not only that falsification of the information code 110 becomes difficult for the person, but also that the person will not have an idea, to begin with, of taking a measure against the covering 111. As a result, the accuracy of determining authenticity of the information code 110 is enhanced.

For example, as shown in FIG. 12, in the information code 110*a* according to the first modification of the present embodiment, one of the plurality of blocks configuring the code region 20 is covered with the covering 111*a*. Thus, since the covering 111*a* is hardly distinguished from the dark-color modules in the code region 20, the fact that the code region 20 is partially covered with the covering 111*a* can be easily kept secret. In FIG. 12, each of the blocks configuring the code region 20 is shown in an area enclosed by a dot-dash line. As shown, each block is mainly configured by eight light-color and dark-color modules which are arrayed in a 4-row and 2-column matrix. However, this should not impose a limitation. Each block may have a different number of modules and a different block configuration.

Figure 13A:
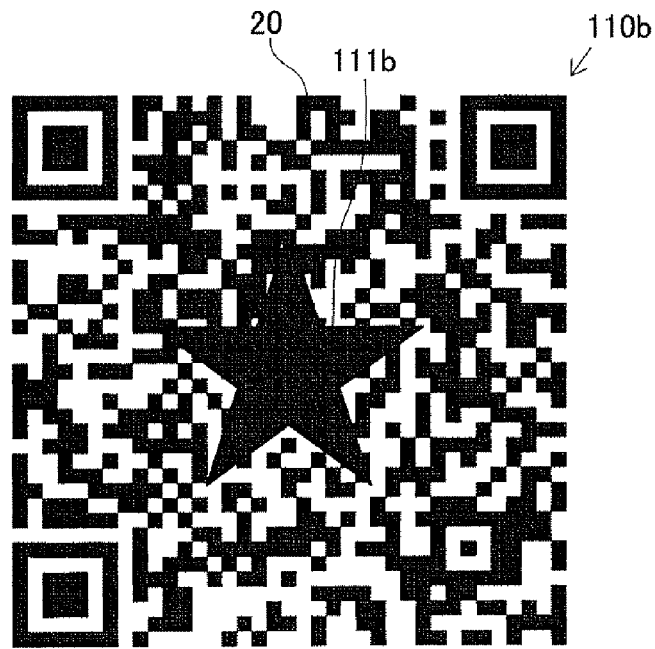
FIG. 13A is an explanatory diagram illustrating an example of an information code, according to a second modification of the fourth embodiment.
Figure 13B:
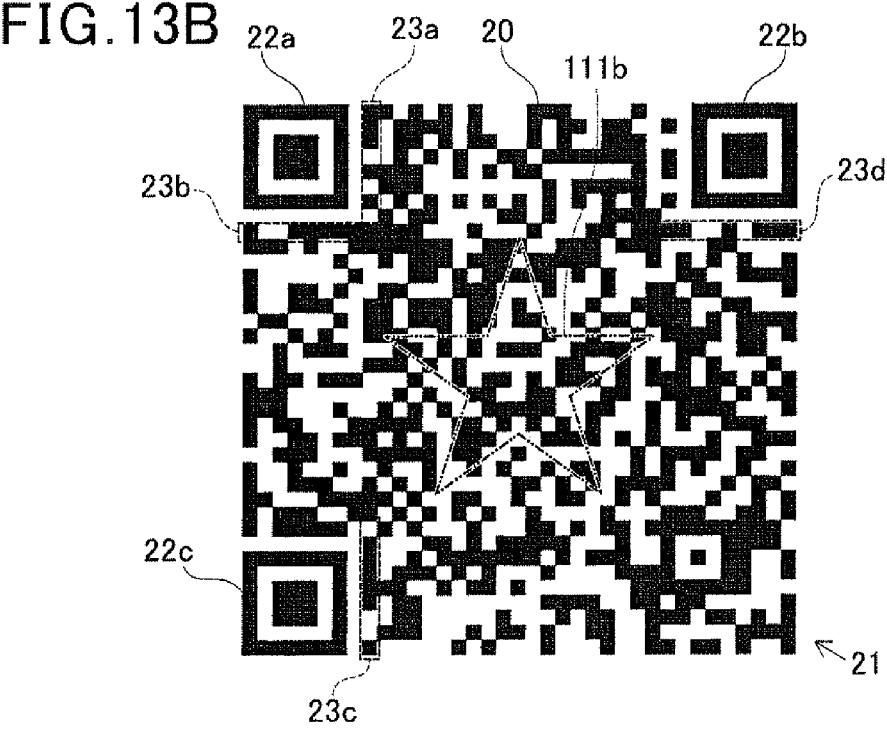
FIG. 13B is an explanatory diagram illustrating a state where a covering has been removed from the information code illustrated in FIG. 13A.
Figure 14:
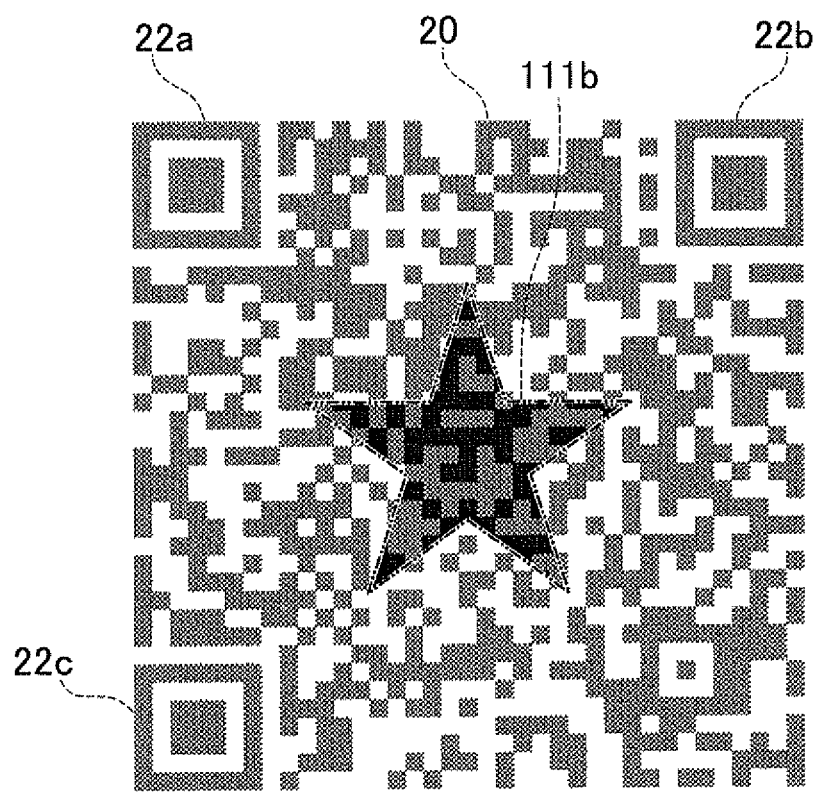
FIG. 14 is an explanatory diagram illustrating an image difference between a first code image illustrated in FIG. 13A and a second code image illustrated in FIG. 13B.

Referring to FIGS. 13A, 13B and 14, an information code 110*b* that is a second modification of the present embodiment is specifically described. FIG. 13A is an explanatory diagram illustrating an example of the information code 110*b* having a covering 111*b*, according to the second modification. FIG. 13B is an explanatory diagram illustrating a state where the covering 111*b* has been removed from the information code 110*b* illustrated in FIG. 13A. FIG. 14 is an explanatory diagram illustrating an image difference between a first code image shown in FIG. 13A and a second code image shown in FIG. 13B. In FIG. 14, dark-color modules corresponding to the area having no image difference are shown in a color lighter than the area having an image difference, i.e. shown in a gray color, for the sake of descriptive convenience.

The information code 110*b* according to the second modification of the present embodiment may use the covering 111*b* having an improved design, replacing the covering 111. The covering 111*b* is formed as an arbitrary graphic, such as a star shape, as shown in FIGS. 13A and 13B, with a design suitable for the environment for usage.

When the covering 111*b* is configured with an arbitrary graphic as well, an image difference according to the covering 111*b* is detected as shown in FIG. 14. Therefore, the information code 110*b* can be used as an information code for determining authenticity. Thus, it is not only that an authenticity determination can be easily made, but also that an information code with an improved design can be realized. The covering 111*b* may have a shape other than the star shape. The covering 111*b* may be formed as an arbitrary graphic having an arbitrary design, with the shape, the pattern and the color being changed according to the environment of usage. With such a configuration as well, the advantages described above can be enjoyed.

Depending on the design of the covering 111*b*, the dark-color modules of the code region 20 may become difficult to be distinguished from the covering 111*b*. However, in this case, the fact that the code region 20 is partially covered with the covering 111*b* can be easily kept secret and thus the advantages similar to those of the first modification can be enjoyed.

Figure 15A:
FIG. 15A is an explanatory diagram illustrating an example of an information code, according to a third modification of the fourth embodiment
Figure 15B:
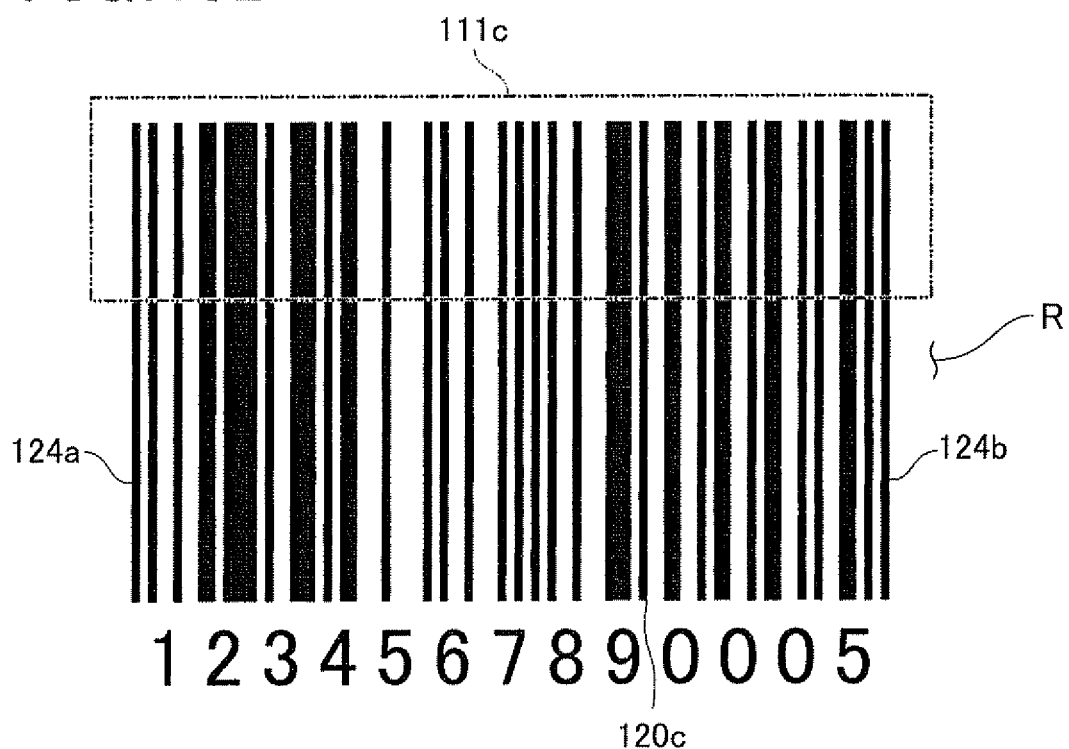
FIG. 15B is an explanatory diagram illustrating a state where a covering has been removed from the information code illustrated in FIG. 15A.
Figure 16:
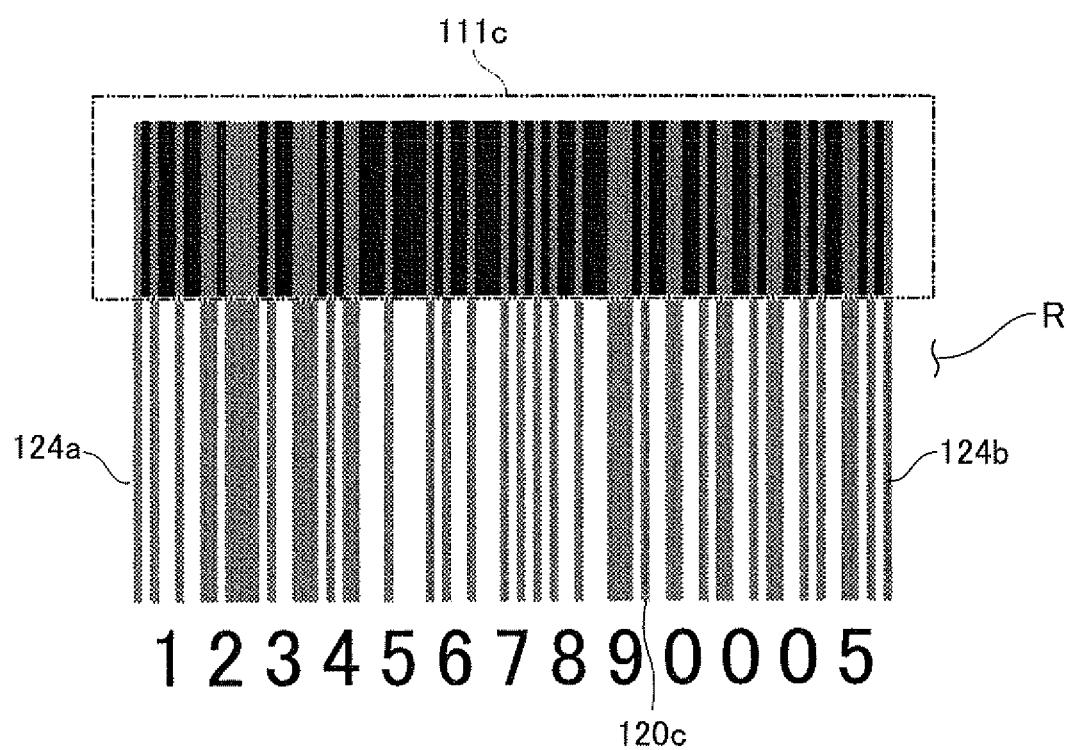
FIG. 16 is an explanatory diagram illustrating an image difference between a first code image illustrated in FIG. 15A and a second code image illustrated in FIG. 15B.

Referring to FIGS. 15A, 15B and 16, hereinafter is specifically described an information code 110*c* according to a third modification of the present embodiment. FIG. 15A is an explanatory diagram illustrating an example of the information code 110*c* having a covering 111*c*, according to the third embodiment. FIG. 15B is an explanatory diagram illustrating a state where the covering 111*c* has been removed from the information code 110*c* illustrated in FIG. 15A. FIG. 16 is an explanatory diagram illustrating an image difference between a first code image shown in FIG. 15A and a second code image shown in FIG. 15B. In FIG. 16, dark-color modules corresponding to the area having no image difference is shown in a color lighter than that of the area having an image difference, i.e. shown in a gray color, for the sake of descriptive convenience.

The information code 110*c* according to the third modification of the present embodiment may use a code region 120*c* and the covering 111*c*, replacing the code region 20 and the covering 111, respectively. In the code region 120*c*, light-color modules (spaces) and dark-color modules (bars) are unidirectionaliy arranged similar to a one-dimensional code. The covering 111*c* partially covers the code region 120*c*. As shown in FIGS. 15A and 15B, for example, the covering 111*c* is arranged so as to cover an upper end portion of the modules configuring the code region 120*c*.

When the code region 120*c* is configured similar to a one-dimensional code as well, an image difference according to the covering 111*c* that covers the upper end portion of the code region 120*c* is detected as shown in FIG. 16. Therefore, the information code 110*c* can be used as an information code for determining authenticity to thereby facilitate authenticity determination. When the code region 120*c* is configured as a one-dimensional code, at step S205 of the authenticity determination process described above, a start character 124*a* and a stop character 124*b* configuring both ends of the code region 120*c* may be extracted as position-detection areas.

In particular, when the start and stop characters 124*a* and 124*b* are permitted to function as the position-detection areas, superposition of the first and second code images is facilitated by bringing the characters 124*a* and 124*b* of the first code image into alignment with the characters 124*a* and 124*b* of the second code image, respectively. As a result, the image difference can be easily detected.

The covering 111*c* in the third modification is arranged so as to cover the upper end portion of the code region 120*c*. However, this should not impose a limitation. The covering 111*c* may be arranged so as to cover a center portion of the code region 120*c*, or a lower end portion of the code region 120*c*. In this way, by arranging the covering 111*c* with respect to the code region 120*c*, even in the first code image to which the light of the second wavelength band is not radiated, the character data, for example, encoded as a one-dimensional code can be decoded.

Figure 17A:
FIG. 17A is an explanatory diagram illustrating an example of an information code, according to a fourth modification of the fourth embodiment.
Figure 17B:
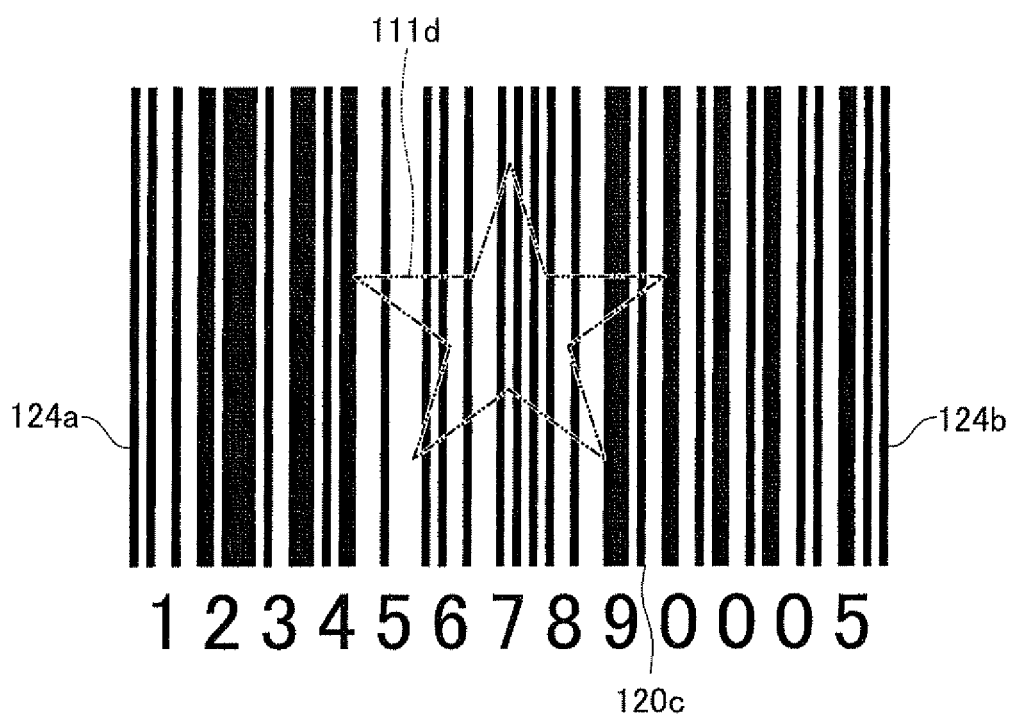
FIG. 17B is an explanatory diagram illustrating a state where a covering has been removed from the information code illustrated in FIG. 17A.
Figure 18:
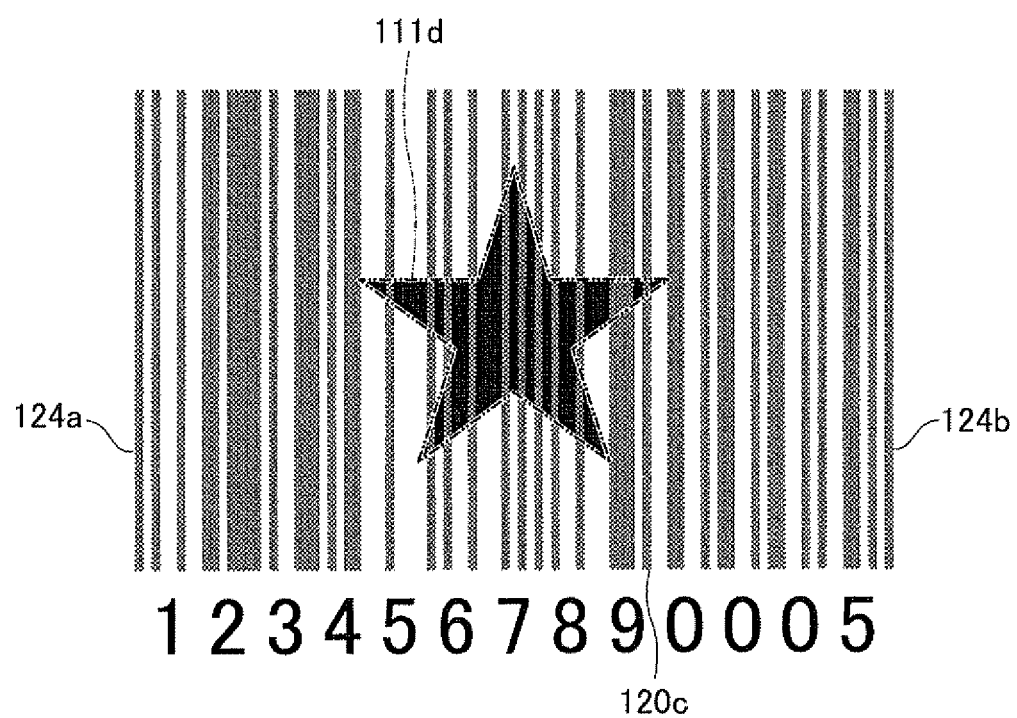
FIG. 18 is an explanatory diagram illustrating an image difference between a first code image illustrated in FIG. 17A and a second code image illustrated in FIG. 17B.

Referring to FIGS. 17A, 17B and 18, hereinafter is described an information code 110*d* according to a fourth modification of the present embodiment. FIG. 17A is an explanatory diagram illustrating an example of the information code 110d having a covering 111d, according to the fourth modification. FIG. 17B is an explanatory diagram illustrating a state where the covering 111d has been removed from the information code 110d illustrated in FIG. 17A. FIG. 18 is an explanatory diagram illustrating an image difference between a first code image shown in FIG. 17A and a second code image shown in FIG. 17B. In FIG. 18, dark-color modules corresponding to the area having no image difference is shown in a color lighter than that of the area having an image difference, i.e. shown in a gray color, for the sake of descriptive convenience.

The information code 110d according to the fourth modification of the present embodiment may use the covering 111d having an improved design, replacing the covering 111c. The covering 111d is formed as an arbitrary graphic, such as a star shape, as shown in FIGS. 17A and 17B, with a design suitable for the environment of usage.

When the covering 111d is configured with such an arbitrary graphic as well, an image difference according to the covering 111d is detected as shown in FIG. 18. Therefore, the information code 110d can be used as an information code for determining authenticity. Thus, it is not only that authenticity determination is facilitated, but also that an information code with an improved design can be realized. The covering 111d may have a shape other than the star shape. The covering 111d may be formed as an arbitrary graphic having an arbitrary design, with the shape, the pattern and the color being changed according to the environment of usage. With such a configuration as well, the advantages described above can be enjoyed.

Depending on the design of the covering 111d, or, for example, when a covering in use has a shape similar to the shape a mode of dark-color modules (bars), the covering 111d may become difficult to be distinguished from the dark-color modules in the code region 120c. In this case, the fact that the code region 120c is partially covered with the covering 111d can be easily kept secret. Thus, the advantages similar to those of the first modification can be enjoyed.

The present invention is not limited to the embodiments and their modifications described so far, but may be modified as follows.

(1) The light of the second wavelength band is not limited to the infrared light of a wavelength band of 750 nm or more. For example, the light of the second wavelength band may be ultraviolet light of a wavelength band of 380 nm or less. In this case, the covering may be configured such that, when the ultraviolet light is radiated, the reflected light from the modules configuring the code region 20 is transmitted through the covering.

Further, the light of the first wavelength band is not limited to the visible light having a wavelength ranging from 380 nm to 750 nm. The light of the first wavelength band may be the light of any wavelength band that cannot be transmitted through the covering, i.e. the light of a wavelength band different from the light of the second wavelength band.

(2) On the premise that the light of the first wavelength band is visible light, the information code reading apparatus 40 does not necessarily have to include the first illumination source 43. In other words, the information code reading apparatus 40 may be configured to include only the second illumination source 44 as the illuminating means that radiates the light of the second wavelength band. Since the light of the first wavelength band is visible light, outside light can be used as the visible light. Thus, the illuminating means does not have to have a function of radiating the light of the first wavelength band to thereby reduce the complexity of the illuminating means.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A two-dimensional information code delineated from a background so as to have a code region, comprising:
   a plurality of light-color modules exhibiting a reflectance property of light color when either light of a first wavelength band or light of a second wavelength band is radiated to the information code, the second wavelength band being different in wavelengths from the first wavelength band;
   a plurality of dark-color modules exhibiting a reflectance property of dark color when either the light of the first wavelength band or the light of the second wavelength band is radiated to the information code; and
   a covering formed to cover a specified partial area of the code region, wherein the specified partial area is either a predetermined area that disables decoding of the information code when the predetermined area is shielded from the light of the first wavelength band or a predetermined area that includes at least part of the plurality of light-color modules, and the covering is transmissive to the light of the second wavelength band and exhibits a reflectance property of dark color to the light of the first wavelength band.

2. The two-dimensional information code of claim 1, wherein the specified partial area is the predetermined area that disables decoding of the information code when the predetermined area is shielded from the light of the first wavelength band.

3. The two-dimensional information code of claim 2, wherein
   the specified partial area is composed of a plurality of specified partial areas which are set in the code region, and
   the covering covers at least one of the plurality of specified partial areas.

4. The two-dimensional information code of claim 3, wherein
   the specified partial area covered by the covering which is selected among the plurality of specified partial areas is previously set based on predetermined information.

5. The two-dimensional information code of claim 2, wherein
   the covering is composed of a covering modeled on a graphic having at least one of a desired shape, a desired design, and desired hues.

6. The two-dimensional information code of claim 1, wherein the specified partial area is a predetermined area that includes at least part of the plurality of light-color modules.

7. The two-dimensional information code of claim 6, wherein
   the code region includes an area for detecting a position of the code, and
   the covering is set to exclude the area for detecting the position.

8. The two-dimensional information code of claim 7, wherein
   the covering is set to be narrower in width than the area for detecting the position.

9. The two-dimensional information code of claim 6, wherein
the covering is composed of a covering modeled on a graphic having at least one of a desired shape, a desired design, and desired hues.

10. An information code reader optically reads an information code delineated from a background so as to have a code region, the information code comprising:
a plurality of light-color modules exhibiting a reflectance property of light color when either light of a first wavelength band or light of a second wavelength band is radiated to the information code, the second wavelength band being different in wavelengths from the first wavelength band;
a plurality of dark-color modules exhibiting a reflectance property of dark color when either the light of the first wavelength band or the light of the second wavelength band is radiated to the information code; and
a covering formed to cover a specified area of the code region, wherein the specified area is either a predetermined area that disables decoding of the information code when the predetermined area is shielded from the light of the first band or a predetermined area that includes at least part of the plurality of light-color modules, and the covering is transmissive to the light of the second wavelength band and exhibits a reflectance property of dark color to the light of the first wavelength band,
wherein the specified area is the predetermined area that disables decoding of the information code when the predetermined area is shielded from the light of the first wavelength band,
the information code reader comprising:
illumination means for radiating, at least, the light of the second wavelength band;
imaging means for imaging the information code in the light of the first and second wavelength bands;
decoding means for decoding the code region based on an array of the modules in the code region which are imaged by the imaging means;
first determining means for determining whether or not the specified area is a dark-color area in a first code image of the information code, the first code image being imaged by the imaging means in a state the illumination means radiates the light of the first wavelength band; and
second determining means for determining that the information code with the covering has been decoded when, after the first determining means determine that the specified area was the dark-color area, the code region is decoded by the decoding means based on a second code image of the information code, the second code image being imaged by the imaging means in a state where the illumination means radiates the light of the second wavelength band.

11. The information code reader of claim 10, wherein the illumination means radiates both the light of the first wavelength band and the light of the second wavelength band.

12. The information code reader of claim 10, wherein the specified area is composed of a plurality of specified partial areas which are set in the code region, and
the covering covers at least one of the plurality of specified partial areas.

13. The information code reader of claim 10, wherein the covering is composed of a covering modeled on a graphic having at least one of a desired shape, a desired design, and desired hues.

14. An information code reader optically reads an information code delineated to have a code region, the information code comprising:
a plurality of light-color modules exhibiting a reflectance property of light color when either light of a first wavelength band or light of a second wavelength band is radiated to the information code, the second wavelength band being different in wavelengths from the first wavelength band;
a plurality of dark-color modules exhibiting a reflectance property of dark color when either the light of the first wavelength band or the light of the second wavelength band is radiated to the information code; and
a covering formed to cover a specified area of the code region, wherein the specified area is either a predetermined area that disables decoding of the information code when the predetermined area is shielded from the light of the first wavelength band or a predetermined area that includes at least part of the plurality of light-color modules, and the covering is transmissive to the light of the second wavelength band and exhibits a reflectance property of dark color to the light of the first wavelength band,
wherein the specified area is the predetermined area that disables decoding of the information code when the predetermined area is shielded from the light of the first wavelength band and is composed of a plurality of specified areas which are set in the code region,
the covering covers at least one of the plurality of specified areas, and
the specified area covered by the covering which is selected among the plurality of specified areas is previously set based on predetermined information,
the information code reader comprising:
illumination means for radiating both the light of the first wavelength band and the light of the second wavelength band;
imaging means for imaging the information code;
decoding means for decoding the code region based on an array of the modules in the code region which are imaged by the imaging means;
first determining means for determining whether or not the specified area is a dark-color area in a first code image of the information code, the first code image being imaged by the imaging means in a state the illumination means radiates the light of the first wavelength band;
second determining means for determining that the information code with the covering has been decoded when, after the first determining means determine that the specified area was the dark-color area, the code region is decoded by the decoding means based on a second code image of the information code, the second code image being imaged by the imaging means in a state where the illumination means radiates the light of the second wavelength band;
acquiring means for acquiring the predetermined information based on an area covered by the covering, the covered area being obtained from a difference between the first and second code images.

15. An information code reader optically reads an information code delineated from a background so as to have a code region, the information code comprising:
a plurality of light-color modules exhibiting a reflectance property of light color when either light of a first wavelength band or light of a second wavelength band is radiated to the information code, the second wavelength band being different in wavelengths from the first wavelength band, the light of the first wavelength band being visible light;

a plurality of dark-color modules exhibiting a reflectance property of dark color when either the light of the first wavelength band or the light of the second wavelength band is radiated to the information code; and a covering formed to cover a specified area of the code region, wherein the specified area is either a predetermined area that disables decoding of the information code when the predetermined area is shielded from the light of the first wavelength band or a predetermined area that includes at least part of the plurality of light-color modules, and the covering is transmissive to the light of the second wavelength band and exhibits a reflectance property of dark color to the light of the first wavelength band, wherein the specified area is the predetermined area that disables decoding of the information code when the predetermined area is shielded from the light of the first wavelength band, the information code reader comprising:

illumination means for radiating the light of the second wavelength band;

imaging means for imaging the information code;

decoding means for decoding the code region based on an array of the modules in the code region which are imaged by the imaging means;

first determining means for determining whether or not the specified area is a dark-color area in a first code image of the information code, the first code image being imaged by the imaging means in a state the information code is subjected to lighting of the light of the first wavelength band; and second determining means for determining that the information code with the covering has been decoded when, after the first determining means determine that the specified area was the dark-color area, the code region is decoded by the decoding means based on a second code image of the information code, the second code image being imaged by the imaging means in a state where the illumination means radiates the light of the second wavelength band.

16. An information code reader optically reads an information code delineated from a background so as to have a code region, the information code comprising:

a plurality of light-color modules exhibiting a reflectance property of light color when either light of a first wavelength band or light of a second wavelength band is radiated to the information code, the second wavelength band being different in wavelengths from the first wavelength band, the light of the first wavelength band being visible light;

a plurality of dark-color modules exhibiting a reflectance property of dark color when either the light of the first wavelength band or the light of the second wavelength band is radiated to the information code; and a covering formed to cover a specified area of the code region, wherein the specified area is either a predetermined area that disables decoding of the information code when the predetermined area is shielded from the light of the first wavelength band or a predetermined area that includes at least part of the plurality of light-color modules, and the covering is transmissive to the light of the second wavelength band and exhibits a reflectance property of dark color to the light of the first wavelength band, wherein the specified area is the predetermined area that disables decoding of the information code when the predetermined area is shielded from the light of the first wavelength band and is composed of a plurality of specified areas which are set in the code region, the covering covers at least one of the plurality of specified areas, and the specified area covered by the covering which is selected among the plurality of specified areas is previously set based on predetermined information, the information code reader comprising:

illumination means for radiating the light of the second wavelength band;

imaging means for imaging the information code;

decoding means for decoding the code region based on an array of the modules in the code region which are imaged by the imaging means;

first determining means for determining whether or not the specified area is a dark-color area in a first code image of the information code, the first code image being imaged by the imaging means in a state the information code is subjected to lighting of the light of the first wavelength band;

second determining means for determining that the information code with the covering has been decoded when, after the first determining means determine that the specified area was the dark-color area, the code region is decoded by the decoding means based on a second code image of the information code, the second code image being imaged by the imaging means in a state where the illumination means radiates the light of the second wavelength band; and acquiring means for acquiring the predetermined information based on an area covered by the covering, the covered area being obtained from a difference between the first and second code images.

17. An information code reader optically reads an information code delineated from a background so as to have a code region, the information code comprising:

a plurality of light-color modules exhibiting a reflectance property of light color when either light of a first wavelength band or light of a second wavelength band is radiated to the information code, the second wavelength band being different in wavelengths from the first wavelength band;

a plurality of dark-color modules exhibiting a reflectance property of dark color when either the light of the first wavelength band or the light of the second wavelength band is radiated to the information code; and a covering formed to cover a specified area of the code region, wherein the specified area is either a predetermined area that disables decoding of the information code when the predetermined area is shielded from the light of the first wavelength band or a predetermined area that includes at least part of the plurality of light-color modules, and the covering is transmissive to the light of the second wavelength band and exhibits a reflectance property of dark color to the light of the first wavelength band, wherein the specified area is a predetermined area that includes at least part of the plurality of light-color modules, the information code reader comprising:

illumination means for radiating, at least, the light of the second wavelength band;

imaging means for imaging the information code;

decoding means for decoding the code region based on an array of the modules in the code region which are imaged by the imaging means; and difference detecting means for detecting a difference between an information code image imaged by the imaging means in a state where the light of the first wavelength band is radiated to the code and an information code image imaged by the imaging means in a state where the light of the second wavelength band is radiate to the code; and determining means for determining whether or not the covering exists, based on the detected difference.

18. The information code reader of claim 17, wherein the illumination means radiates both the light of the first wavelength band and the light of the second wavelength band.

19. The information code reader of claim 18, wherein:
the code region includes an area for detecting a position of the code,
the covering is set to exclude the area for detecting the position, and
the covering is set to be narrower in width than the area for detecting the position.

20. An information code reader optically reads an information code delineated from a background so as to have a code region, the information code comprising:
a plurality of light-color modules exhibiting a reflectance property of light color when either light of a first wavelength band or light of a second wavelength band is radiated to the information code, the second wavelength band being different in wavelengths from the first wavelength band, the light of the first wavelength band being visible light;
a plurality of dark-color modules exhibiting a reflectance property of dark color when either the light of the first wavelength band or the light of the second wavelength band is radiated to the information code; and
a covering formed to cover a specified area of the code region, wherein the specified area is either a predetermined area that disables decoding of the information code when the predetermined area is shielded from the light of the first wavelength band or a predetermined area that includes at least part of the plurality of light-color modules, and the covering is transmissive to the light of the second wavelength band and exhibits a reflectance property of dark color to the light of the first wavelength band, wherein the specified area is a predetermined area that includes at least part of the plurality of light-color modules, the information code reader comprising:

illumination means for radiating the light of the second wavelength band;

imaging means for imaging the information code;

decoding means for decoding the code region based on an array of the modules in the code region which are imaged by the imaging means; and difference detecting means for detecting a difference between an information code image imaged by the imaging means in a state where the code is subjected to lighting of the light of the first wavelength band and an information code image imaged by the imaging means in a state where the light of the second wavelength band is radiate to the code; and determining means for determining whether or not the covering exists, based on the detected difference.

* * * * *